(12) United States Patent
Yamamura

(10) Patent No.: US 9,053,387 B2
(45) Date of Patent: Jun. 9, 2015

(54) IMAGE PROCESSING CIRCUIT AND IMAGE DETECTION DEVICE

(71) Applicant: MegaChips Corporation, Osaka-shi (JP)

(72) Inventor: Naotsugu Yamamura, Kitakatsuragi-gun (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 14/219,453

(22) Filed: Mar. 19, 2014

(65) Prior Publication Data

US 2014/0294293 A1 Oct. 2, 2014

(30) Foreign Application Priority Data

Mar. 29, 2013 (JP) ................................. 2013-072401

(51) Int. Cl.
*G06K 9/62* (2006.01)
*G06K 9/66* (2006.01)
*G06K 9/00* (2006.01)
*G06T 7/40* (2006.01)

(52) U.S. Cl.
CPC ............ *G06K 9/6202* (2013.01); *G06K 9/6256* (2013.01); *G06K 9/66* (2013.01); *G06T 7/404* (2013.01); *G06K 9/00228* (2013.01); *G06K 9/00281* (2013.01); *G06T 2207/30201* (2013.01)

(58) Field of Classification Search
None
See application file for complete search history.

(56) References Cited

U.S. PATENT DOCUMENTS

| 8,428,353 | B2 | 4/2013 | Nishiyama et al. | |
| 2009/0067015 | A1* | 3/2009 | Sasaki | 358/505 |
| 2009/0220156 | A1* | 9/2009 | Ito et al. | 382/201 |
| 2013/0163876 | A1* | 6/2013 | Silver et al. | 382/190 |

FOREIGN PATENT DOCUMENTS

JP  2012-53769  3/2012

* cited by examiner

*Primary Examiner* — Brian P Werner
(74) *Attorney, Agent, or Firm* — Oblon, McClelland, Maier & Neustadt, L.L.P.

(57) ABSTRACT

Each second selection circuit selects, out of a plurality of evaluation values, an evaluation value being in a predetermined relative positional relation with a first evaluation value as an evaluation value outputted from a first selection circuit, and outputs the selected value. The predetermined relative positional relations are different from one another among a plurality of second selection circuits. Every time a second evaluation value is outputted from the second selection circuit corresponding to the integration circuit, the integration circuit reads a weigh value corresponding to a combination of the second evaluation value and the first evaluation, which makes a pair with the second evaluation and is outputted from the first selection circuit, from a storage circuit corresponding to the second selection circuit and integrates the read values. An addition circuit at least adds a plurality of integrated values outputted from a plurality of integration circuits, and an addition value obtained thereby becomes a probability value.

10 Claims, 23 Drawing Sheets

F I G . 5
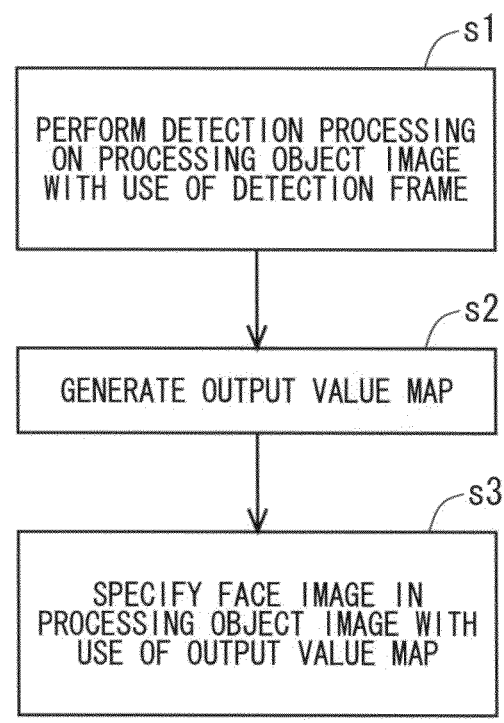

F I G. 6
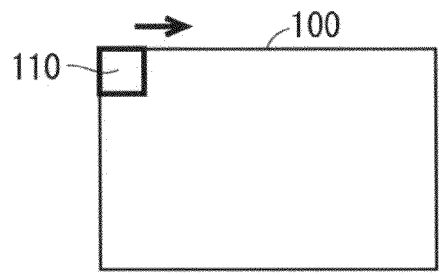
F I G. 7
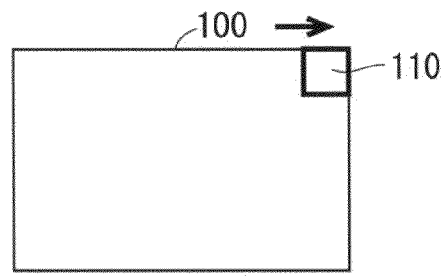
F I G. 8
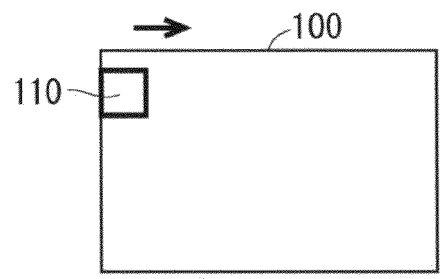
F I G. 9
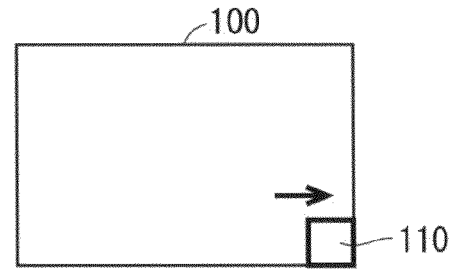

F I G . 1 0
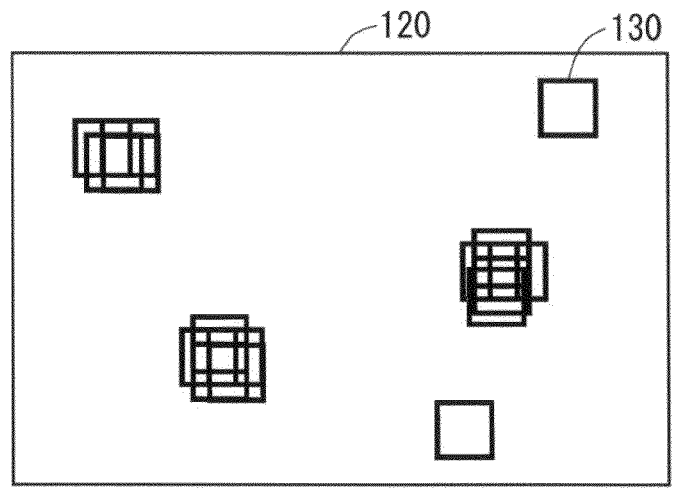
F I G . 1 1
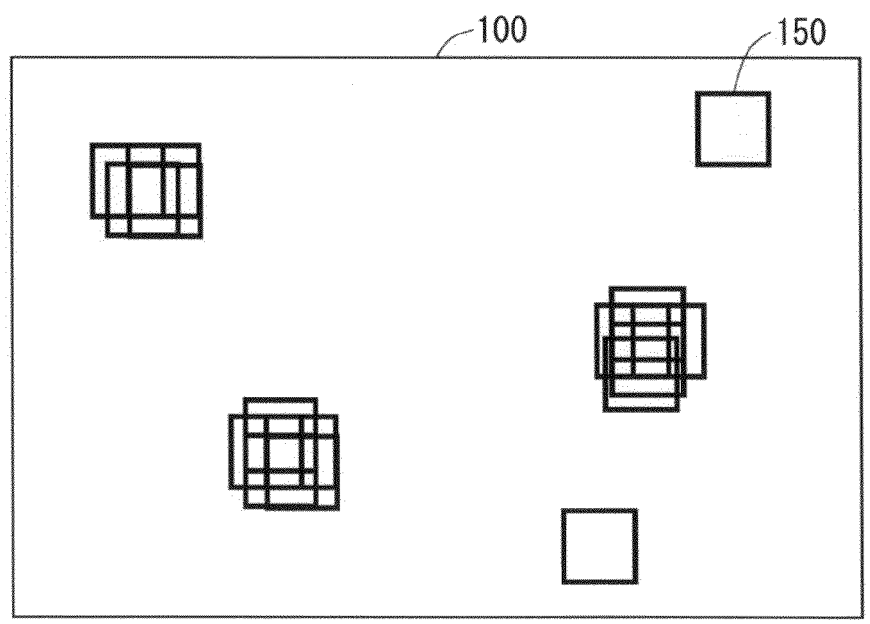

00111100＝60

(−1) 0 1 1 1 0 (−1) (−1)

00111000 = 56

1000011 = 131

F I G. 3 3
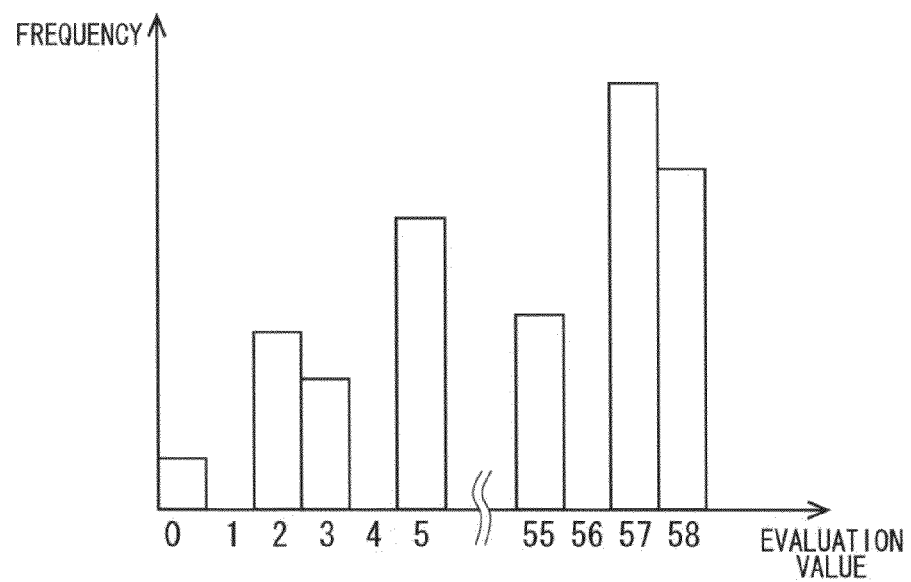
F I G. 3 4
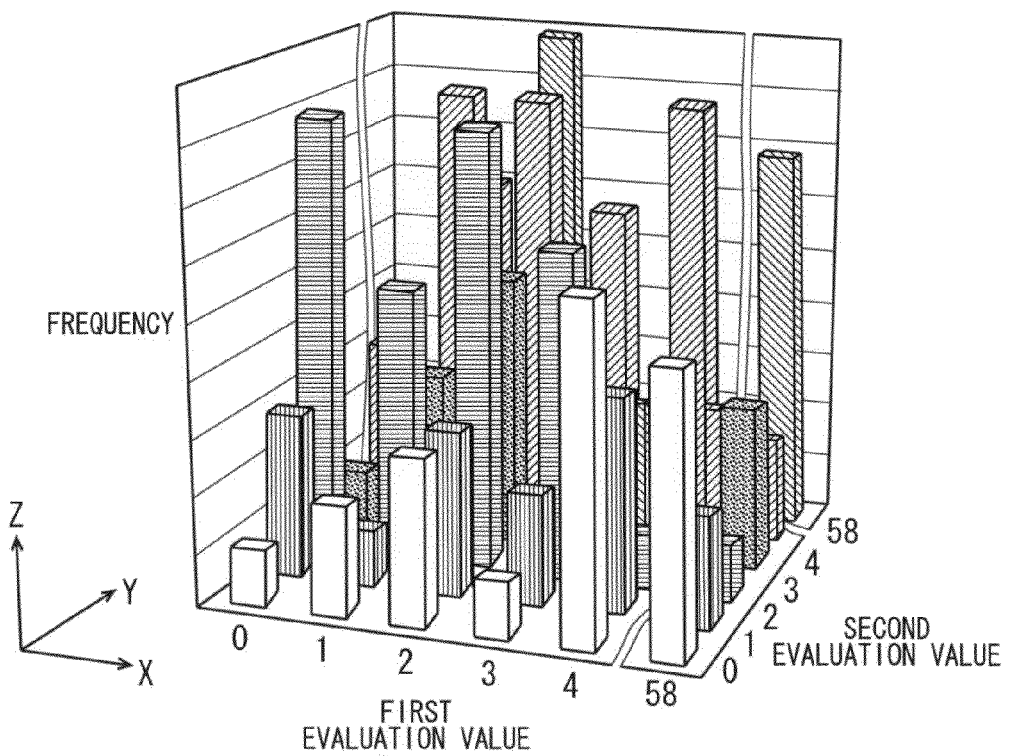

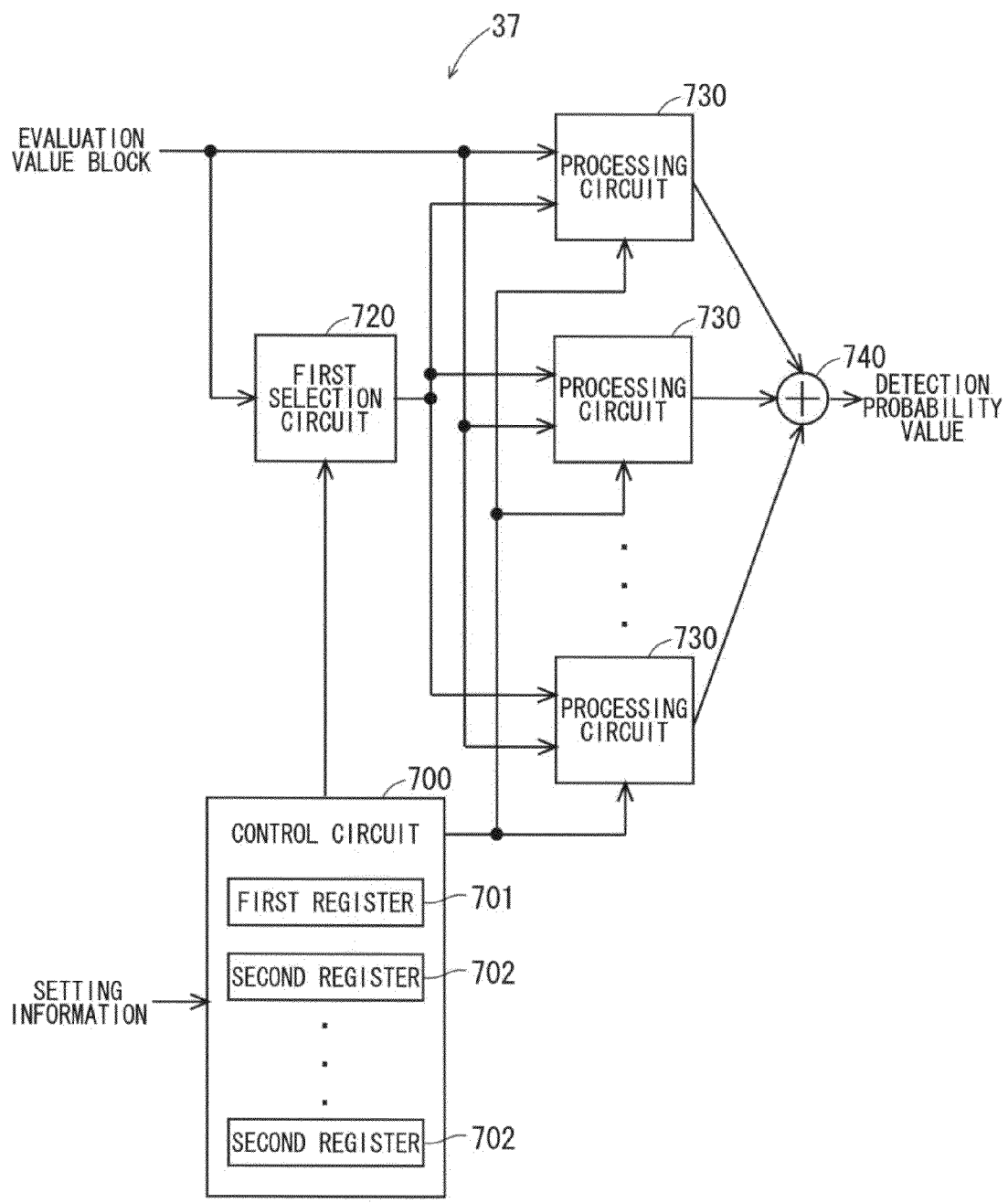

| EVALUATION VALUE<br>(EVALUATION VALUE SINGLE<br>CHARACTERISTIC AMOUNT) | WEIGHT VALUE |
|---|---|
| 0 | α 0 |
| 1 | α 1 |
| . . . | . . . |
| 5 8 | α 5 8 |

| EVALUATION VALUE PAIR (CO-OCCURRENCE CHARACTERISTIC AMOUNT) | WEIGHT VALUE |
|---|---|
| (0, 0) | $\beta 0-0$ |
| (0, 1) | $\beta 0-1$ |
| ... | ... |
| (58, 58) | $\beta 58-58$ |

IMAGE PROCESSING CIRCUIT AND IMAGE DETECTION DEVICE

BACKGROUND OF THE INVENTION

1. Field of the Invention

The present invention relates to a technique for obtaining a probability value indicative of a probability that an image is a specific image.

2. Description of the Background Art

As described in Japanese Patent Application Laid-Open No. 2012-053769, there have hitherto been proposed a variety of techniques for obtaining a value indicative of characteristics of an image.

SUMMARY OF THE INVENTION

Incidentally, in processing for obtaining a probability value indicative of a probability that an image is a specific image based on a value representing characteristics of the image, improvement in a processing speed is desired.

Therefore, the present invention has been made in view of the above circumstance, and an object thereof is to provide a technique capable of improving a processing speed in processing for obtaining a probability value indicative of a probability that an image is a specific image.

A first aspect of an image processing circuit is an image processing circuit for obtaining a probability value indicative of a probability that an input image is a specific image, the circuit including: a first selection circuit for selecting one evaluation value out of a plurality of evaluation values which indicate respective characteristics of a plurality of pixels included in the input image and are allocated with positions different from one another, and outputting the selected value; a plurality of second selection circuits, each for selecting one evaluation value from the plurality of evaluation values and outputting the selected value; a plurality of storage circuits provided respectively corresponding to the plurality of second selection circuits; a plurality of integration circuits provided respectively corresponding to the plurality of second selection circuits; an addition circuit; and a control circuit for controlling selection of the evaluation values in the first selection circuit and the plurality of second selection circuits, wherein the first selection circuit sequentially changes one evaluation value selected out of the plurality of evaluation values, to change an evaluation value to be outputted, each of the plurality of second selection circuits selects, out of the plurality of evaluation values, one evaluation value being in a predetermined relative positional relation with a first evaluation value as an evaluation value which is outputted from the first selection circuit, and outputs the selected value, the predetermined relative positional relations are different from one another among the plurality of second selection circuits, each of the plurality of storage circuits stores a weigh value based on a learning sample concerning the specific image in accordance with a combination of a second evaluation value as an evaluation value which is outputted from the corresponding second selection circuit and the first evaluation value which makes a pair with the second evaluation value and is outputted from the first selection circuit, every time the second evaluation value is outputted from the second selection circuit corresponding to the integration circuit, the integration circuit reads, from the storage circuit corresponding to the second selection circuit, the weigh value in accordance with a combination of the second evaluation value and the first evaluation value which makes a pair with the second evaluation value and is outputted from the first selection circuit, to integrate the read values and outputs the consequently obtained integrated value, and the addition circuit at least adds a plurality of integrated values outputted from the plurality of integration circuits, so that an addition value is obtained and becomes the probability value.

A second aspect of the image processing circuit is the above first aspect, wherein the weigh values stored in the plurality of storage circuits are rewritable.

A third aspect of the image processing circuit is the above first aspect, wherein the image processing circuit is capable of obtaining the probability value concerning each of plural kinds of specific images, the probability value being indicative of a probability that the input image is the specific image, each of the plurality of storage circuits stores plural kinds of weigh values which respectively correspond to the plural kinds of specific images, and each of the plural kinds of weigh values are based on a learning sample concerning the corresponding specific image in accordance with a combination of the second evaluation value outputted from the second selection circuit corresponding to the storage circuit and the first evaluation value which makes a pair with the second evaluation value and is outputted from the first selection circuit, the control circuit sets the kind of weigh value to be used with respect to the plurality of integration circuits, and every time the second evaluation value is outputted from the second selection circuit corresponding to the integration circuit, the integration circuit reads, from the storage circuit corresponding to the second selection circuit, the weigh value of the kind set by the control circuit in accordance with a combination of the second evaluation value and the first evaluation value which makes a pair with the second evaluation value and is outputted from the first selection circuit, to integrate the read values.

A fourth aspect of the image processing circuit is the above second aspect, wherein the control circuit further includes a register which stores setting information for setting an operation to select the evaluation value in each of the plurality of second selection circuits.

A fifth aspect of the image processing circuit is the above first aspect, wherein the image processing circuit is capable of obtaining a second probability value indicative of a probability that the input image is a second specific image of which a kind is different from that of a first specific image as the specific image, the plurality of second selection circuits have, as operation modes, a first mode which becomes effective at the time of obtaining a first probability value as the probability value concerning the first specific image, and a second mode which becomes effective at the time of obtaining the second probability value, the control circuit sets the operation mode of the plurality of second selection circuits, a position of the second evaluation value in the first mode and a position of the second evaluation value, both making a pair with the same first evaluation value, are horizontally symmetrical or vertically symmetrical each other with respect to a position of the first evaluation value in each of the plurality of second selection circuits, in a case where the second selection circuit corresponding to the integration circuit is on the first mode, every time the second evaluation value is outputted from the second selection circuit, the integration circuit reads from the storage circuit corresponding to the second selection circuit the weigh value in accordance with a combination of the second evaluation value and the first evaluation value which makes a pair with the second evaluation value and is outputted from the first selection circuit, to integrate the read values and outputs the consequently obtained integrated value as a first integrated value, while in a case where the second selection circuit corresponding to the integration circuit is on the second mode, every time the second evaluation value is outputted from the second selection circuit, the integration circuit reads from the storage circuit corresponding to the second selection circuit the weigh value in accordance with a combination of the second evaluation value and the first evaluation value which makes a pair with the second evaluation value and is outputted from the first selection circuit, to integrate the read values and outputs the consequently obtained integrated value as a second integrated value, the addition circuit at least adds a plurality of integrated values outputted from the plurality of integration circuits in a case where the plurality of second selection circuits are on the first mode, so that a first addition value is obtained and becomes the first probability value, and the addition circuit at least adds a plurality of integrated values outputted from the plurality of integration circuits in a case where the plurality of second selection circuits are on the second mode, so that a second addition value is obtained and becomes the second probability value.

A sixth aspect of the image processing circuit includes: an image processing circuit for taking, as an input image, each of a plurality of images selected from a processing object image and obtaining a probability value indicative of a probability that the input image is a specific image; and a specification section for specifying the specific image in the processing object image based on the probability value found in the image processing circuit, wherein the image processing circuit has: a first selection circuit for selecting one evaluation value out of a plurality of evaluation values which indicate respective characteristics of a plurality of pixels included in the input image and are allocated with positions different from one another, and outputting the selected value; a plurality of second selection circuits, each for selecting one evaluation value from the plurality of evaluation values and outputting the selected value; a plurality of storage circuits provided respectively corresponding to the plurality of second selection circuits; a plurality of integration circuits provided respectively corresponding to the plurality of second selection circuits; an addition circuit; and a control circuit for controlling selection of the evaluation values in the first selection circuit and the plurality of second selection circuits, the first selection circuit sequentially changes one evaluation value selected out of the plurality of evaluation values, to change an evaluation value to be outputted, each of the plurality of second selection circuits selects, out of the plurality of evaluation values, one evaluation value being in a predetermined relative positional relation with a first evaluation value as an evaluation value which is outputted from the first selection circuit, and outputs the selected value, the predetermined relative positional relations are different from one another among the plurality of second selection circuits, each of the plurality of storage circuits stores a weigh value based on a learning sample concerning the specific image in accordance with a combination of a second evaluation value as an evaluation value which is outputted from the corresponding second selection circuit and the first evaluation value which makes a pair with the second evaluation value and is outputted from the first selection circuit, every time the second evaluation value is outputted from the second selection circuit corresponding to each of the plurality of integration circuits, the integration circuit reads, from the storage circuit corresponding to the second selection circuit, the weigh value in accordance with a combination of the second evaluation value and the first evaluation value which makes a pair with the second evaluation value and is outputted from the first selection circuit, to integrate the read values and outputs the consequently obtained integrated value, and the addition circuit at least adds a plurality of integrated values outputted from the plurality of integration circuits, so that an addition value is obtained and becomes the probability value.

A seventh aspect of the image processing circuit is the above sixth aspect, wherein the image processing circuit obtains the probability value concerning each of plural kinds of specific images, the probability value being indicative of a probability that the input image is the specific image, each of the plurality of storage circuits stores plural kinds of weigh values which respectively correspond to the plural kinds of specific images, and each of the plural kinds of weigh value being are based on a learning sample concerning the corresponding specific image in accordance with a combination of the second evaluation value outputted from the second selection circuit corresponding to the storage circuit and the first evaluation value which makes a pair with the second evaluation value and is outputted from the first selection circuit, the control circuit sets the kind of weigh value to be used with respect to the plurality of integration circuits, every time the second evaluation value is outputted from the second selection circuit corresponding to the integration circuit, the integration circuit reads, from the storage circuit corresponding to the second selection circuit, the weigh value of the kind set by the control circuit in accordance with a combination of the second evaluation value and the first evaluation value which makes a pair with the second evaluation value and is outputted from the first selection circuit, to integrate the read values, and the specification section specifies a predetermined entire image with each of the plural kinds of specific images taken as part thereof in the processing target image based on the probability values concerning the plural kinds of specific images obtained in the image processing circuit.

An eighth aspect of the image processing circuit is the above seventh aspect, wherein the plural kinds of specific images are images of a plurality of parts constituting a human body, and the predetermined entire image is an image of a human whole body.

A ninth aspect of the image processing circuit is the above sixth aspect, wherein the image processing circuit obtains a second probability value indicative of a probability that the input image is a second specific image of which a kind is different from that of a first specific image as the specific image, the plurality of second selection circuits have, as operation modes, a first mode which becomes effective at the time of obtaining a first probability value as the probability value concerning the first specific image, and a second mode which becomes effective at the time of obtaining the second probability value, the control circuit sets the operation mode of the plurality of second selection circuits, a position of the second evaluation value in the first mode and a position of the second evaluation value, both making a pair with the same first evaluation value, are horizontally symmetrical or vertically symmetrical each other with respect to a position of the first evaluation value in each of the plurality of second selection circuits, in a case where the second selection circuit corresponding to the integration circuit is on the first mode, every time the second evaluation value is outputted from the second selection circuit, the integration circuit reads from the storage circuit corresponding to the second selection circuit the weigh value in accordance with a combination of the second evaluation value and the first evaluation value which makes a pair with the second evaluation value and is outputted from the first selection circuit, to integrate the read values and outputs the consequently obtained integrated value while in a case where the second selection circuit corresponding to the integration circuit is on the second mode, every time the second evaluation value is outputted from the second selection circuit, the integration circuit reads from the storage circuit corresponding to the second selection circuit the weigh value in accordance with a combination of the second evaluation value and the first evaluation value which makes a pair with the second evaluation value and is outputted from the first selection circuit, to integrate the read values and outputs the consequently obtained integrated value, the addition circuit at least adds a plurality of integrated values outputted from the plurality of integration circuits in a case where the plurality of second selection circuits are on the first mode, so that a first addition value is obtained and becomes the first probability value, the addition circuit at least adds a plurality of integrated values outputted from the plurality of integration circuits in a case where the plurality of second selection circuits are on the second mode, so that a second addition value is obtained and becomes the second probability value, and the specification section specifies a predetermined entire image with the first and second specific images taken as a left-side part and a right-side part or an upper-side part and a lower-side part in the processing object image based on the first and second probability values obtained in the image processing circuit.

A tenth aspect of the image processing circuit is the above ninth aspect, wherein the first and second specific images are images of a left-side part and a right-side part of a human face, and the predetermined entire image is an image of an entire human face.

A processing speed of obtaining a probability value indicative of a probability that an image is a specific image is improved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a flowchart showing operations of the image detecting section;

FIGS. 6 to 11 are diagrams each for explaining the operations of the image detecting section;

FIG. 33 is a diagram showing an example of a one-dimensional evaluation value histogram;

FIG. 34 is a diagram showing an example of a two-dimensional evaluation value histogram;

FIG. 35 is a diagram showing a configuration of the probability value acquiring circuit;

DESCRIPTION OF THE PREFERRED EMBODIMENTS

Figure 1:
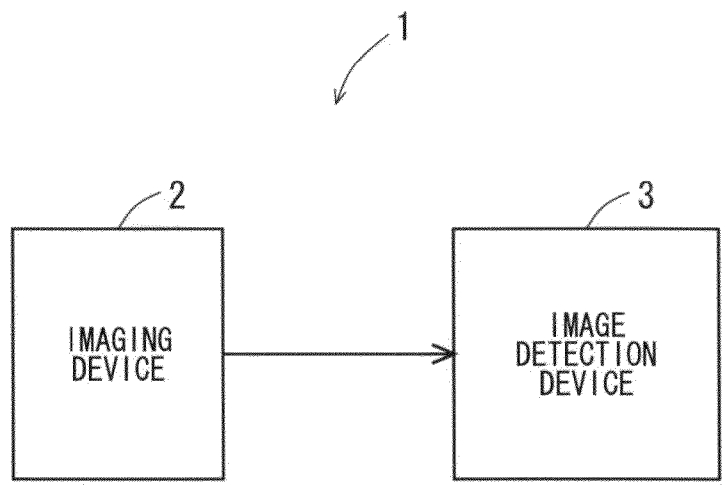
FIG. 1 is a diagram showing a configuration of an image processing system.

FIG. 1 is a diagram showing a configuration of an image processing system 1 provided with an image detection device 3 according to a preferred embodiment. The image processing system 1 is provided with the image detection device 3 and an imaging device 2. The imaging device 2 captures an image, and outputs image data indicating a captured image to the image detection device 3. The image detection device 3 detects a detection object image (also referred to as "specific image") from the captured image indicated by the inputted image data. The image processing system 1 is used, for example, in a monitoring camera system, a digital camera system, or the like. In the present preferred embodiment, the detection object image is, for example, a human face image. Hereinafter, simply mentioning a "face image" refers to a human face image. Further, a captured image of an object from which the detection object image is detected is referred to as a "processing object image". It is to be noted that the detection object image may be an image other than a face image. For example, the detection object image may be an image of a human body (image of a human whole body.

Figure 2:
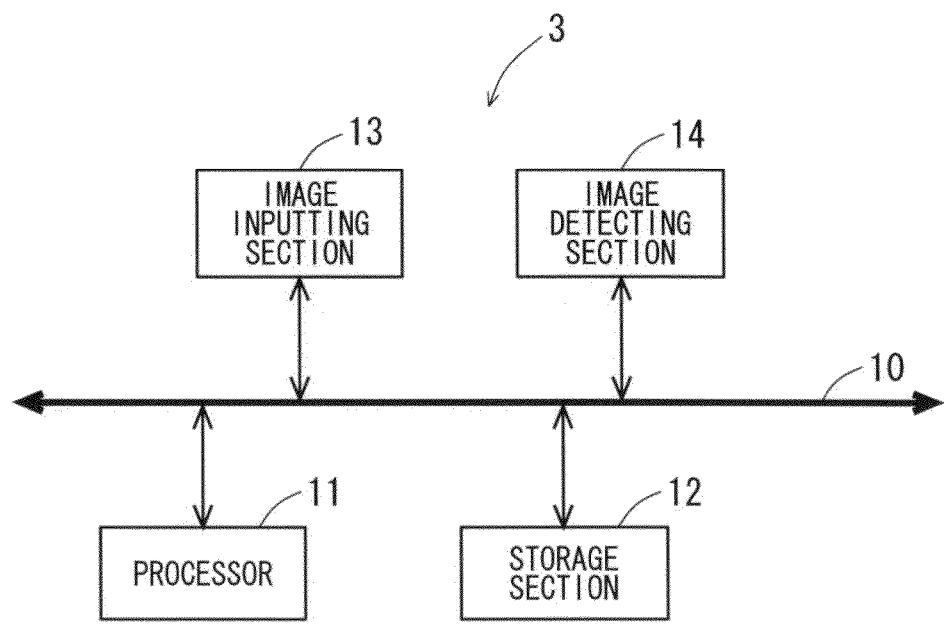
FIG. 2 is a diagram showing a configuration of an image detection device.

FIG. 2 is a diagram showing a configuration of the image detection device 3. As shown in FIG. 2, the image detection device 3 is provided with a processor 11 such as a CPU (Central Processing Unit), a storage section 12 made up of a ROM (Read Only Memory), a RAM (Random Access Memory) and the like, an image inputting section 13 and an image detection section 14, and these are electrically connected with one another through a bus 10.

The processor 11 controls the storage section 12, the image inputting section 13 and the image detection section 14, to control an operation of the entire image detection device 3 comprehensively. A variety of processing executed by the processor 11 are realized by the processor 11 executing a variety of programs stored in the ROM of the storage section 12.

A plurality of image data respectively indicating a plurality of images sequentially captured by the imaging device 2 are sequentially inputted into the image inputting section 13. The image inputting section 13 reduces the image indicated by the inputted image data, and outputs image data indicating the image after reduced to the image detection section 14. The image detection section 14 takes an image indicated by the inputted image data as a processing object image and detects a face image from the processing object image.

<Configuration of Image Inputting Section>

Figure 3:
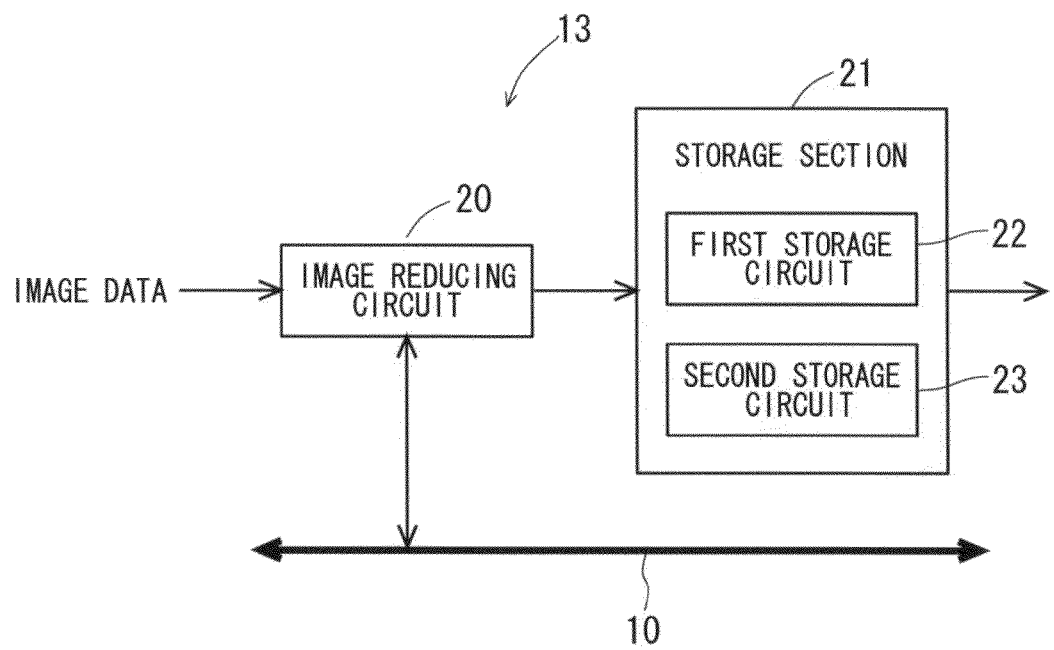
FIG. 3 is a diagram showing a configuration of an image inputting section.

FIG. 3 is a block diagram showing a hardware configuration of the image inputting section 13. As shown in FIG. 3, the image inputting section 13 is provided with an image reducing circuit 20 connected to the bus 10, and a storage section 21 having a first storage circuit 22 and a second storage circuit 23. Each of the first storage circuit 22 and the second storage circuit 23 is, for example, a RAM.

A plurality of image data respectively indicating a plurality of images sequentially captured by the imaging device 2 are sequentially inputted into the image reducing circuit 20. In the imaging device 2, for example, L (L≥2) images are captured per second. That is, an imaging frame rate of the imaging device 2 is L fps (frame per second). Further, M1 (M1≥2) pixels are arrayed in a row direction and N1 (N1≥2) pixels are arrayed in a column direction in the image captured by the imaging device 2. A resolution of the image captured by the imaging device 2 is, for example, a full high-vision with M1=1920 and N1=1080.

It is to be noted that a size of a region, where m (m≥1) pixels are arrayed in the row direction and n (n≥1) pixels are arrayed in the column direction, is hereinafter represented by m p×n p (p means pixels). Further, among a plurality of values arranged in the matrix form, a value located on the m-th row and the n-th column with the left top taken as a reference may be referred to as the m×n-th value. Moreover, among a plurality of pixels arranged in the matrix form, a pixel located on the m-th row and the n-th column with the left top taken as the reference may be referred to the m×n-th pixel.

Every time image data is inputted from the imaging device 2, the image reducing circuit 20 reduces a size of an image indicated by the image data, and writes the image data indicating the reduced image alternately into the first storage circuit 22 and the second storage circuit 23. While the image data is written into one of the first storage circuit 22 and the second storage circuit 23, the image data stored in the other of the first storage circuit 22 and the second storage circuit 23 is used and face-image detection processing is performed on the reduced image indicated by the image data in the image detection section 14. In the present preferred embodiment, the image reduced in the image reducing circuit 20 becomes the processing object image. That is, the image indicated by the image data stored in each of the first storage circuit 22 and the second storage circuit 23 becomes the processing object image.

In the processing object image, M2 (M2≥2) pixels are arrayed in the row direction and N2 (N2≥2) pixels are arrayed in the column direction. In the image reducing circuit 20, the size of the image indicated by the inputted image data is reduced, for example, from 1920 p×1080 p to 960 p×540 p and a resolution of the processing object image is thereby M2=960 and N2=540.

As thus described, with the first storage circuit 22 and the second storage circuit 23 functioning as a so-called ping-pong buffer, a processing speed is improved.

<Configuration of Image Detecting Section>

Figure 4:
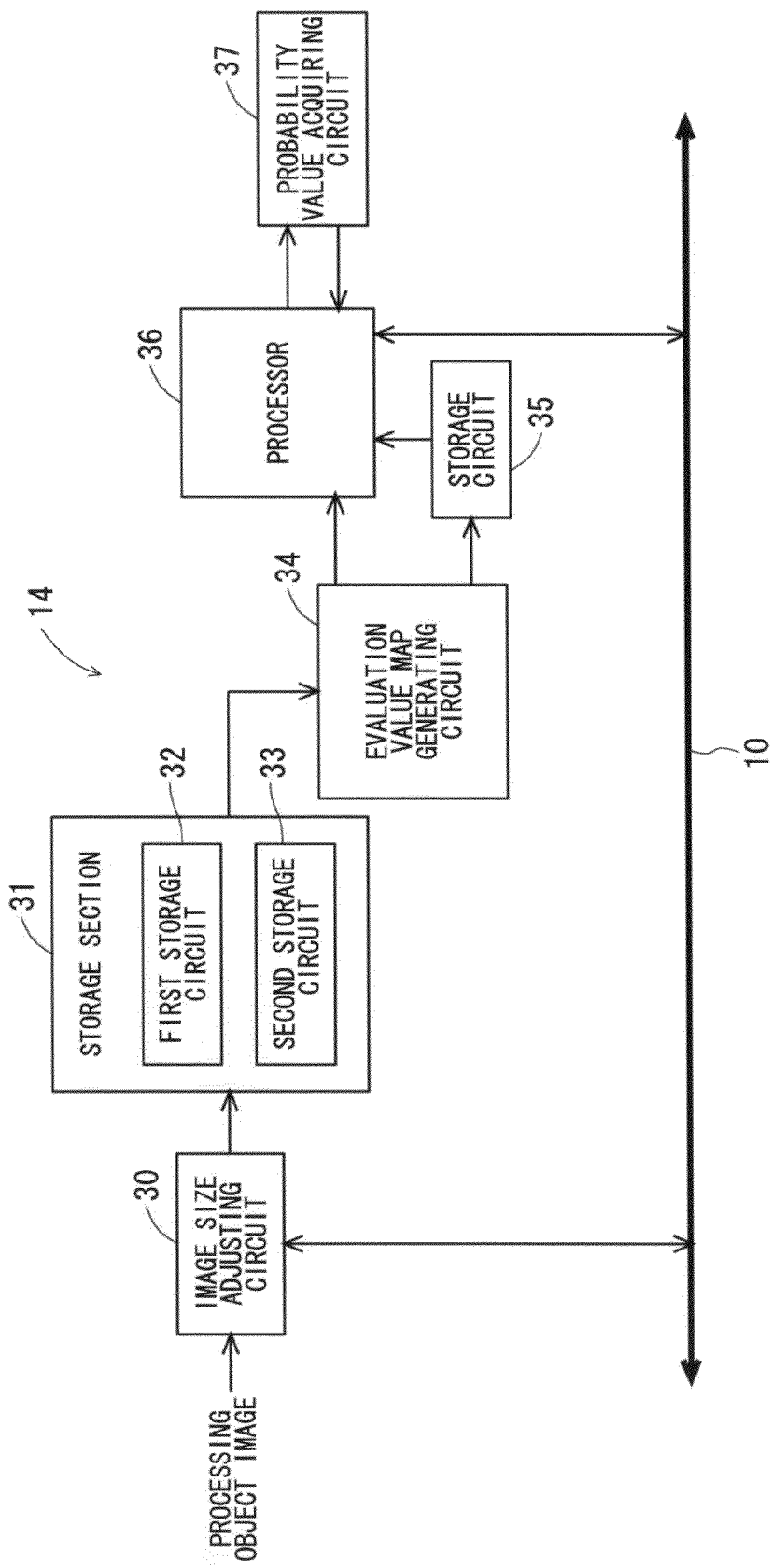
FIG. 4 is a diagram showing a configuration of an image detecting section.

FIG. 4 is a block diagram showing a hardware configuration of the image detection section 14. As shown in FIG. 4, the image detection section 14 is provided with an image size adjusting circuit 30, a storage section 31, an evaluation value map generating circuit 34, a storage circuit 35, a processor 36 and a probability value acquiring circuit 37. The image size adjusting circuit 30 and the processor 36 are connected to the bus 10. The storage section 31 is configured of a first storage circuit 32 and a second storage circuit 33. Each of the first storage circuit 32 and the second storage circuit 33 is, for example, a RAM.

Processing by the processor 36 is realized by the processor 36 executing a variety of programs stored in the storage section 12. In the image detection section 14, a program is not required for realizing a function of each of the elements (the image size adjusting circuit 30, etc.) other than the processor 36, and the function of each of the elements is realized only by hardware. In the image detection device 3 according to the present preferred embodiment, the function of the element having "circuit" in its name is realized only by hardware.

The image size adjusting circuit 30 reads image data alternately from the first storage circuit 22 and the second storage circuit 23 of the image inputting section 13. Upon completion of the processing on the processing object image indicated by the image data read from one of the first storage circuit 22 and the second storage circuit 23 in the image detection section 14, the image size adjusting circuit 30 reads image data from the other of the first storage circuit 22 and the second storage circuit 23, to acquire a next processing object image. Then, upon completion of the processing on the acquired next processing object image in the image detection section 14, the image size adjusting circuit 30 reads image data from the one of the first storage circuit 22 and the second storage circuit 23, to acquire a next processing image. The image size adjusting circuit 30 hereafter repeats the same operation as above.

As thus described, since image data are read alternately from the first storage circuit 22 and the second storage circuit 23, as soon as processing on the processing object image is completed, processing on the next processing object image can be started. Accordingly, it is possible to efficiently execute processing on images sequentially obtained in the imaging device 2.

In the following, while a series of processing performed in the image detection section 14 is described, how each constitutional element constituting the image detection section 14 operates in the series of processing will be described. It should be noted that part or all of later-described processing performed by the processor 36 may be performed by the processor 11.

FIG. 5 is a flowchart showing a summary of the series of processing in the image detection section 14 at the time of the image detection section 14 detecting a face image from a processing object image. Every time the image size adjusting circuit 30 reads image data from the storage section 21, the series of processing shown in FIG. 5 is performed on a processing object image indicated by the image data.

As shown in FIG. 5, with use of a detection frame, the image detection section 14 performs detection processing on the processing object image indicated by the image data read by the image size adjusting circuit 30 from the storage section 21, to detect a region with a high probability of being a face image in the same size as that of the detection frame as a detection result region. Hereinafter, simply mentioning "detection processing" refers to this detection processing.

Next, in Step s2, the image detection section 14 generates a later-mentioned output value map based on a result of the detection processing in Step s1. Then, in Step s3, the image detection section 14 specifies a face image in the processing object image based on the output value map generated in Step s2. Thereby, the face image is detected from the processing object image, and the processing on the processing object image is completed.

Upon completion of the processing on the processing object image in the image detection section 14, image data indicating the next processing object image is read by the image size adjusting circuit 30 from the storage section 21. Then in the image detection section 14, with the image data, the processing of Steps s1 to s3 are executed on the next processing object image. Hereinafter, the image detection section 14 operates in the same manner as above.

<Detail of Detection Processing>

Next, the detection processing in Step s1 will be described in detail. In the present preferred embodiment, the image detection section 14 performs the detection processing with use of plural kinds of detection frames in different sizes in order to detect face images in a variety of sizes in the processing object image. For example, 30 kinds of detection frames are used in the image detection section 14.

In the present preferred embodiment, as described later, the image detection section 14 obtains a probability value (also referred to as "detection probability value") indicative of a probability that an image is a face image. Then, in the image detection section 14, it is necessary to use an image in a reference size (normalized size) for an object image whose detection probability value is to be found.

On the other hand, in the present preferred embodiment, the plural kinds of detection frames in different sizes from each other include a detection frame in the same size as the reference size and a detection frame in a different size from the reference size. Hereinafter, the detection frame in the same size as the reference size is referred to as a "reference detection frame" and the detection frame in a different size from the reference size is referred to as a "non-reference detection frame". In the present preferred embodiment, a detection frame in the minimum size out of the plural kinds of detection frames is set as the reference detection frame. Therefore, the size of the non-reference detection frame is larger than the reference size. The size of the reference detection frame is, for example, 16 p×16 p. Further, the plural kinds of detection frames include, for example, a non-reference detection frame in a size of 18 p×18 p, a non-reference detection frame in a size of 20 p×20 p, and the like.

At the time of performing the detection processing on the processing object image with use of the reference detection frame, the image detection section 14 performs face-mage detection on an image within the reference detection frame, while moving the reference detection frame in the processing object image, to determine whether the image has a high probability of being a face image. Then, the image detection section 14 takes a region, that it has determined to have a high probability of being a face image (an image within the reference detection frame), as a detection result region.

On the other hand, at the time of performing the detection processing on the processing object image with use of the non-reference detection frame, the image detection section 14 changes the size of the non-reference detection frame to the size coincides with the reference size. Then, the image detection section 14 changes the size of the processing object image in accordance with the size change in the non-reference detection frame. The image detection section 14 performs face-image detection on an image within the non-reference detection frame subjected to the size change, while moving the non-reference detection frame in the non-processing object image subjected to the size change, to determine whether the image has a high probability of being a face image. The image detection section 14 then specifies a region with a high probability of being a face image in the processing object image in an original size not subjected to the size change based on the region determined to have a high probability of being a face image in the processing object image subjected to the size change (the image within the non-reference detection frame after the size change), and takes the region as a detection result region.

The processing object image after the size change at the time of the detection processing being performed on the processing object image with use of the non-reference detection frame is hereinafter referred to as a "size-changed image". Further, the non-reference detection frame after the size change at the time of the detection processing being performed on the processing object image with use of the non-reference detection frame is hereinafter referred to as a "size-changed detection frame".

In the image detection section 14, for example, the detection processing is first performed with use of the reference detection frame, and the detection processing is then performed with use of each of plural kinds of non-reference detection frames. Upon acquirement of image data indicating a processing object image from the image inputting section 13, the image size adjusting circuit 30 stores the image data as it is into the first storage circuit 32. Then, while the detection processing is performed on the processing object image indicated by the image data stored in the first storage circuit 32 with use of the reference detection frame, the image size adjusting circuit 30 reduces the processing object image to generate a size-changed image corresponding to a subsequently used non-reference detection frame, and stores image data indicating the size-changed image into the second storage circuit 33.

Next, while the processing is performed on the size-changed image indicated by the image data stored in the second storage circuit 33 with use of the non-reference detection frame corresponding thereto, the image size adjusting circuit 30 reduces the processing object image to generate a size-changed image corresponding to a subsequently used non-reference detection frame, and stores image data indicating the size-changed image into the first storage circuit 32. Then, while the processing is performed on the size-changed image indicated by the image data stored in the first storage circuit 32 with use of the non-reference detection frame corresponding thereto, the image size adjusting circuit 30 reduces the processing object image to generate a size-changed image corresponding to a subsequently used non-reference detection frame, and stores image data indicating the size-changed image into the second storage circuit 33.

Hereinafter, the image size adjusting circuit 30 operates in the same manner as above, to write image data indicating the generated size-changed images alternately into the first storage circuit 32 and the second storage circuit 33. As thus described, with the first storage circuit 32 and the second storage circuit 33 functioning as a so-called ping-pong buffer, a processing speed is improved.

As thus described, in the present preferred embodiment, the operation of the image detection section 14 at the time of the image detection section 14 performing the detection processing on the processing object image with use of the reference detection frame is different from the operation of the image detection section 14 at the time of the image detection section 14 performing the detection processing on the processing object image with use of the non-reference detection frame. Hereinafter, the operation of the image detection section 14 will be described in detail.

When using a reference detection frame for the detection processing, the image detection section 14 sets the reference detection frame in the processing object image, and obtains a detection probability value indicative of a probability that an image within the reference detection frame in the processing object image is a face image. On the other hand, when using a non-reference detection frame for the detection processing, the image detection section 14 sets a size-changed detection frame, obtained by changing a size of the non-reference detection frame, in a size-changed image obtained by changing a size of the processing object image, and obtains a detection probability value indicative of a probability that an image within the size-changed detection frame in the size-changed image is a face image. Hereinafter, an image within the reference detection frame and an image within the size-changed detection frame, whose detection probability values are to be found, may be collectively referred to as an "image within the frame".

Here, since the size of the reference detection frame coincides with the reference size, the size of the image within the reference detection frame in the processing object image is the reference size. Further, since the size of the size-changed detection frame coincides with the reference size, the size of the image within the size-changed detection frame in the size-changed image is the reference size. Therefore, the image detection section 14 can always set a size of an object image whose detection probability value is to be found, as the reference size. The image detection section 14 obtains a detection probability value indicative of a probability that the image within the frame is a face image with use of a weigh value (also referred to as "weigh coefficient" or "learning data") generated based on a learning sample (sample image for learning) concerning the face image. The detection probability value indicates a probability that an image within the reference detection frame or an image within the size-changed detection frame is a face image (a face). In the image detection section 14, the detection probability value is found with use of a SVM (Support Vector Machine) or Adaboost, for example.

In the image detection section 14, the probability value acquiring circuit 37 obtains the detection probability value. When the detection probability value found in the probability value acquiring circuit 37 is not smaller than a threshold, the processor 36 determines that the image within the frame has a high probability of being a face image. That is, when the reference detection frame is used, the processor 36 determines that the image within the reference detection frame in the processing object image is a region with a high probability of being a face image in the same size as that of the reference detection frame. Further, when the non-reference detection frame is used, the processor 36 determines that the image within the size-changed detection frame in the size-changed image is a region with a high probability of being a face image in the same size as that of the size-changed detection frame.

On the other hand when the detection probability value found in the probability value acquiring circuit 37 is smaller than the threshold, the processor 36 determines that the image within the frame has a high probability of not being a face image. That is, when the reference detection frame is used, the processor 36 determines that the image within the reference detection frame in the processing object image is not a region with a high probability of being a face image in the same size as that of the reference detection frame. Further, when the non-reference detection frame is used, the processor 36 determines that the image within the size-changed detection frame in the size-changed image is not a region with a high probability of being a face image in the same size as that of the size-changed detection frame.

Hereinafter, the processing of determining whether or not a detection probability value is not smaller than a threshold, performed by the processor 36, may be referred to as "probability value determination processing".

When determining that the image within the reference detection frame in the processing object image is a region with a high probability of being a face image in the same size as that of the reference detection frame, the processor 36 takes the image as a detection result region, and takes the reference detection frame as a detection result frame.

Moreover, when determining that the image within the size-changed detection frame in the size-changed image is a region with a high probability of being a face image in the same size as that of the size-changed detection frame, the processor 36 takes an outer shape frame of the region as a provisional detection result frame. Then, the processor 36 specifies a region with a high probability of being a face image in the same size as that of the non-reference detection frame in the processing object image as the original image of the size-changed image based on the provisional detection result frame, to take the region as a detection result region and also take an outer shape frame of the detection result region as a final detection result frame.

<Detection Processing with Use of Reference Detection Frame>

Next, there will be described a series of operations of the image detection section 14 at the time of the image detection section 14 determining whether an image within the reference detection frame has a high probability of being a face image, while moving the reference detection frame in the processing object image. FIGS. 6 to 9 are diagrams for explaining the operations of the image detection section 14. The image detection section 14 performs the face-image detection on an image within a reference detection frame while making the reference detection frame raster-scanned.

As shown in FIG. 6, in the image detection section 14, the processor 36 first sets a reference detection frame 110 at the top left of a processing object image 100 indicated by image data stored in the first storage circuit 32. Then, by control of the processor 36, the probability value acquiring circuit 37 obtains a detection probability value concerning an image within the reference detection frame 110 in the processing object image 100, and outputs the found value to the processor 36. The processor 36 performs probability value determination processing with use of the detection probability value inputted from the probability value acquiring circuit 37, and as a result, when the detection probability value is not smaller than a threshold, the processor 36 determines that a region within the reference detection frame 110 at the top left of the processing object image 100 has a high probability of being a face image, to take the region as a detection result region and take the reference detection frame 110 being an outer shape frame of the region as a detection result frame.

Next, the processor 36 moves the reference detection frame 110 slightly to the right in the processing object image 100. The processor 36 moves the reference detection frame 110 to the right just by one pixel or a few pixels, for example. Then, the probability value acquiring circuit 37 obtains a detection probability value concerning an image within the reference detection frame 110 after moved in the processing object image 100. When the detection probability value found by the probability value acquiring circuit 37 is not smaller than the threshold, the processor 36 determines that the image within the reference detection frame 110 after moved has a high probability of being a face image, to take the region as a detection result region and also take the reference detection frame 110 being an outer shape frame of the image as a detection result frame.

Thereafter, the image detection section 14 operates in the same manner as above, and as shown in FIG. 7, when the reference detection frame 110 moves to the right end of the processing object image 100, the probability value acquiring circuit 37 obtains a detection probability value concerning an image within the reference detection frame 110 at the right end. When the found detection probability value is not smaller than the threshold, the processor 36 takes the image within the reference detection frame 110 at the right end as a detection result region and also takes the reference detection frame 110 at the right end as a detection result frame.

Next, as shown in FIG. 8, the processor 36 moves the reference detection frame 110 to the left end of the processing object image 100 while slightly getting it down. The processor 36 moves the reference detection frame 110 downward just by one pixel or a few pixels, for example, in a vertical direction (column direction). Then, the probability value acquiring circuit 37 obtains a detection probability value concerning an image within the current reference detection frame 110. When the found detection probability value is not smaller than the threshold, the processor 36 determines that the image within the current reference detection frame 110 has a high probability of being a face image, to take the image as a detection result region and also take the reference detection frame 110 as a detection result frame.

Subsequently, the image detection section 14 operates in the same manner as above, and as shown in FIG. 9, when the reference detection frame 110 moves to the bottom right of the processing object image 100, the probability value acquiring circuit 37 obtains a detection probability value concerning an image within the reference detection frame 110 at the right end. When the found detection probability value is not smaller than the threshold, the processor 36 takes the image within the reference detection frame 110 at the bottom right as a detection result region and takes the reference detection frame at the bottom right as a detection result frame.

As thus described, with use of the reference detection frame, the image detection section 14 detects in the processing object image a region with a high probability of being a face image in the same size as that of the reference detection frame, as a detection result region. In other words, with use of the reference detection frame, the image detection section 14 specifies the face image in the same size as that of the reference detection frame in the processing object image.

<Detection Processing with Use of Non-Reference Detection Frame>

When the image detection section 14 performs the detection processing with use of a non-reference detection frame, the processor 36 changes a size of the non-reference detection frame such that the size of the non-reference detection frame coincides with the reference size (the size of the reference detection frame). Further, the image size adjusting circuit 30 changes a size of the processing object image at the same ratio as a ratio of the size change in the non-reference detection frame, and stores image data indicating a size-changed image obtained thereby into the first storage circuit 32 or the second storage circuit 33.

In the present embodiment, since the reference size is 16 p×16 p, for example when a non-reference detection frame in a size of R p×R p (R>16) is to be used, the processor 36 multiples each of a longitudinal width (width in the vertical direction) and a lateral width (width in the horizontal direction) of the non-reference detection frame by 16/R, to reduce the non-reference detection frame and generate a size-changed detection frame. Then, the image size adjusting circuit 30 multiples each of a longitudinal width (number of pixels) and a lateral width (number of pixels) of the processing object image by 16/R, to reduce the processing object image and generate a size-changed image.

In the same manner as in the foregoing processing described using FIGS. 6 to 9, the image detection section 14 obtains a detection probability value concerning an image within the size-changed detection frame, while moving the size-changed detection frame in the size-changed image indicated by image data stored in the first storage circuit 32 or the second storage circuit 33. Then in the image detection section 14, based on the found detection probability value, the processor 36 determines whether the image within the size-changed detection frame has a high probability of being a face image in the same size as that of the size-changed detection frame. That is, with use of the size-changed detection frame, the image detection section 14 performs processing of detecting a region with a high probability of being the face image in the same size as that of the size-changed detection frame in the size-changed image. Hereinafter, this processing is referred to as "size-change version detection processing". Further, a reference detection frame and a size-changed detection frame which are used for acquiring a detection probability value concerning an image within the frame are collectively referred to as a "probability value acquirement frame". The probability value acquirement frame does not include a non-reference detection frame before a size change.

In the size-change version detection processing, when the image detection section 14 sets a size-changed detection frame in a size-changed image and determines that an image within the size-changed detection frame has a high probability of being a face image in the same size as that of the size-changed detection frame, the processor 36 takes an outer shape frame of the image as a provisional detection result frame.

When acquiring at least one provisional detection result frame in the size-changed image, the processor 36 converts the at least one provisional detection result frame to a detection result frame according to the processing object image being served as an original of the size-changed image.

Specifically, the processor 36 first sets at least one obtained provisional detection result frame, having been obtained, in the size-changed image. FIG. 10 is a diagram showing a state where a provisional detection result frame 130 is set in a size-changed image 120. In the example of FIG. 10, a plurality of provisional detection result frames 130 are set in the size-changed image 120.

As shown in FIG. 11, the processor 36 next enlarges (changes a size of) the size-changed image 120 which is set with the provisional detection result frames 130 to get the size back to the original one, thereby converting the size-changed image 120 to the processing object image 100. Hence the provisional detection result frames 130 set in the size-changed image 120 is also enlarged, and as shown in FIG. 11, the provisional detection result frame 130 is converted to a detection result frame 150 in accordance with the processing object image 100. A region within the detection result frame 150 in the processing object image 100 becomes a detection result region with a high probability of being a face image in the same size as that of the non-reference detection frame in the processing object image 100. Accordingly, in the image detection section 14, a detection result region with a high probability of being a face image in the same size as that of the non-reference detection frame in the processing object image is specified based on the provisional detection result frame 130 obtained by the size-change version detection processing.

As thus described, at the time of performing the detection processing on the processing object image with use of the non-reference detection frame, the image detection section 14 performs the size-change version detection processing with use of the non-reference detection frame whose size has been changed so as to coincide with the reference size, and the processing object image whose size has been changed in accordance with the size change in the non-reference detection frame. Accordingly, even when a detection frame in a different size from the reference size is to be used, the image detection section 14 can obtain a detection probability value concerning an image in the reference size. Accordingly, the image detection section 14 specifies a detection result region with a high probability of being a face image in the same size as that of the non-reference detection frame in the processing object image based on a result of the size-change version detection processing. Hence the detection processing with use of the non-reference detection frame is performed in the image detection section 14.

The image detection section 14 first executes such detection processing as above with use of the reference detection frame, and then performs it by respective use of plural kinds of non-reference detection frames in sequence. Therefore, when a face image is included in the processing object image, a detection result region (a region with a high probability of being a face image) and a detection result frame (an outer shape frame of the region with a high probability of being the face image) are obtained, while a detection probability value corresponding to the detection result frame is obtained. The detection probability value corresponding to the detection result frame, obtained concerning the processing object image, indicates a probability that an image within the detection result frame in the processing object image is a face image.

Figure 12:
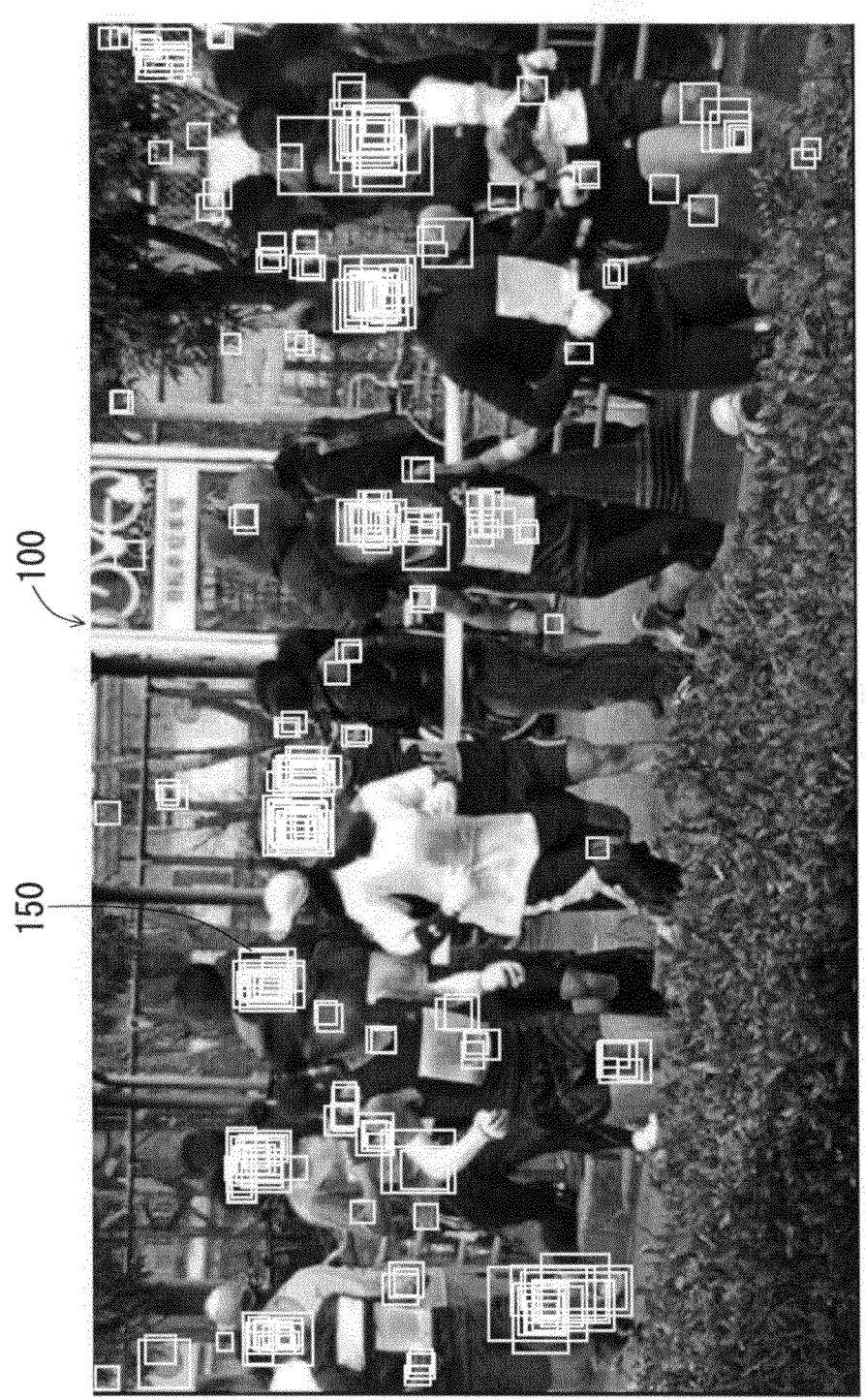
FIG. 12 is a view showing detection result frames as superimposed on a processing object image.

FIG. 12 is a view showing a state where the detection result frames 150 obtained concerning the processing object image 100 are arranged as superimposed on the processing object image 100. As shown in FIG. 12, by performing the detection processing with use of plural kinds of detection frames in different sizes from one another, the detection result frames 150 in a variety of sizes are obtained. This means that face images in a variety of sizes included in the processing object image 100 have been detected.

<Output Value Map Generation Processing>

Next, generation processing for an output value map in Step s2 will be described. In the image detection section 14, based on a result of the detection processing with use of plural kinds of detection frames, the processor 36 generates an output value map showing distribution in a processing object image concerning detection probability values each indicative of a probability as a face image (a probability of being a face image).

Here, as described later, in the detection processing with use of the reference detection frame, namely in calculation processing for a detection probability value concerning an image within the reference detection frame, a processing object image in a size of (M2−2) p×(N2−2) p, which is smaller than an original size of (M2 p×N2 p) just by one pixel on the periphery, is practically used. That is, in the foregoing detection processing described using FIGS. 6 to 9, there is used a processing object image which is smaller than the original size just by one pixel on the periphery. This processing object image is especially referred to as a "calculating processing object image". The processing object image 100 shown in each of FIGS. 6 to 9 is practically a "calculating processing object image". Further, in the detection processing with use of the non-reference detection frame, namely in calculation processing for a detection probability value concerning an image within the non-reference detection frame, a size-changed image in a size smaller than a size of the size-changed image found as described above just by one pixel on the periphery is practically used. Hereinafter, this size-changed image will be especially referred to as a "calculating size-changed image".

Figure 13:
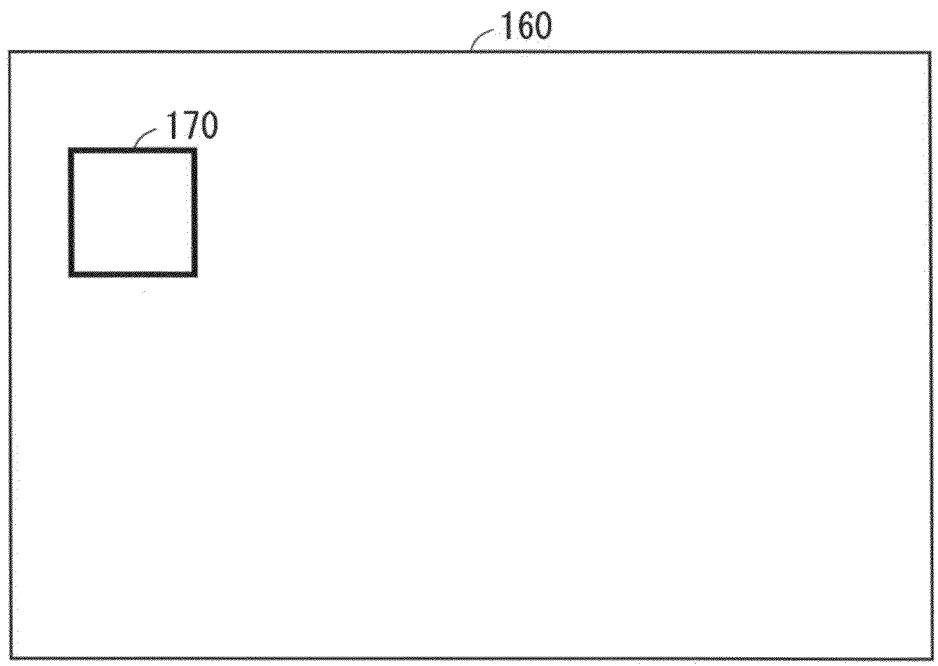
FIGS. 13 and 14 are diagrams each for explaining a method for generating an output value map.

At the time of generating an output value map, the processor 36 thinks of a map 160 made up of a total of ((M2−2)× (N2−2)) values which are (M2−2) values arrayed in the row direction and (N2−2) values arrayed in the column direction in the same manner as in the calculating processing object image. Then, the processor 36 takes one detection result frame in the processing object image as an object detection result frame, and sets a frame 170 in the same size as that of the object detection result frame in the map 160. FIG. 13 is a diagram showing a state where the frame 170 has been set in the map 160.

Figure 14:
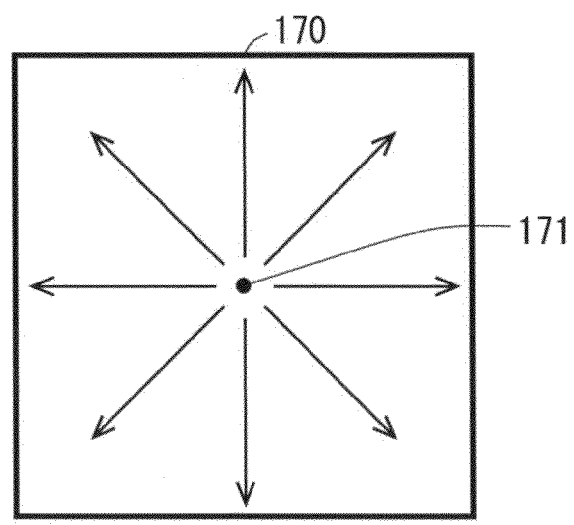

Next, the processor 36 decides each value outside the frame 170 in the map 160 to be "0", and decides each value inside the frame 170 with use of a detection probability value corresponding to the object detection result frame (a detection probability value obtained as a result of performing face-image detection on an image within a detection frame having become the object detection result frame). When the size of the object detection result frame is, for example, 16 p×16 p, 16 values in the row direction and 16 values in the column direction, a total of 256 values, exist within the frame 170. Further, when the size of the object detection result frame is, for example, 20 p×20 p, 20 values in the row direction and 20 values in the column direction, a total of 400 values, exist within the frame 170. FIG. 14 is a diagram for explaining a method for deciding each value within the frame 170.

The processor 36 sets a value of a center 171 within the frame 170 as a detection probability value corresponding to the object detection result frame. Then the processor 36 makes a plurality of values other than that within the frame 170 gradually become smaller from the center 171 within the frame 170 outward in accordance with a normal distribution curve having the value of the center 171 of the frame 170 set as the maximum value. Accordingly, each of a plurality of values constituting the map 160 is decided, to complete the map 160 corresponding to the object detection result frame.

As thus described, the processor 36 generates a plurality of maps 160 respectively corresponding to a plurality of detection result frames concerning the processing object image. The processor 36 then synthesizes the generated plurality of maps 160, to generate an output value map.

Specifically, the processor 36 adds the m×n-th value of the generated plurality of maps 160, and takes an addition value obtained thereby as the m×n-th detection probability value of the output value map. In such a manner, the processor 36 obtains each detection probability value constituting the output value map. This leads to completion of the output value map showing distribution of the detection probability values in the processing object image. The output value map is configured of ((M2−2)×(N2−2)) detection probability values, as is the calculating processing object image. By referencing the output value map, a region with a high probability of being a face image can be specified in the processing object image. That is, by referencing the output value map, a face image in the processing object image can be specified.

Figure 15:
FIG. 15 is a view showing an example of the output value map.

FIG. 15 is a view showing an output value map concerning the processing object image 100, as superimposed on the processing object image 100. In FIG. 15, the output value map is shown as magnitudes of detection probability values are divided into five stages from a first stage to a fifth stage, for example. In the output value map shown in FIG. 15, a region with a detection probability value belonging to the fifth stage for the largest detection probability value is indicated by sandy hatching, and a region belonging to the fourth stage for the second largest detection probability value is indicated by left-up hatching. Further, in the output value map of FIG. 15, a region with a detection probability value belonging to the third stage for the third largest detection probability value is indicated by right-up hatching, and a region belonging to the second stage with the fourth largest detection probability value is indicated by vertically linear hatching. Then, in the output value map shown in FIG. 15, a region with a detection probability value belonging to the first stage for the smallest detection probability value is not indicated by hatching.

In the output value map shown in FIG. 15, a detection probability value in a region corresponding to a face image in the processing object image 100 is high. This means that face images included in the processing object image 100 have been appropriately detected.

When the output value map is generated in Step s2 in such a manner, the processor 36 specifies a face image in the processing object image based on the output value map in Step s3. Specifically, in the output value map, the processor 36 specifies a region whose detection probability value is not smaller than a threshold, and identifies as a face image a region existing in the same position as the above region in the processing object image. Then, at the time of displaying the processing object image in a display device not shown, the processor 36 makes a rectangular frame or the like surround the face image in the processing object image.

As thus described, in the present preferred embodiment, the processor 36 specifies a face image in the processing object image based on a detection probability value found concerning the processing object image. Hence the processor 36 functions as a specification section for specifying a detection object image (specific image) in the processing object image.

It is to be noted that the processor 36 may compare a previously registered face image with a face image specified in the processing object image, to determine whether or not those images coincide with each other. When the previously registered face image and the face image specified in the processing object image do not coincide with each other, the processor 36 may perform mosaic processing on the face image in the processing object image and then display the processing object image in the display device. Hence in the case of using the image detection device 3 according to the present preferred embodiment for a monitoring camera system, even when a face image of a next-door neighbor is photographed by the monitoring camera, it is possible to make the face image unidentifiable. That is, it is possible to realize privacy masking.

Although a face image is specified in the processing object image based on the output value map in the present preferred embodiment, the face image in the processing object image may be specified without the output value map being generated. For example, the processor 36 integrates a plurality of detection result regions (detection result frames) close to one another by means of clustering by Mean-Shift method as well as Nearest Neighbor method, to specify as a face image an image within the detection result region (detection result frame) after integrated in the processing object image. Even in such a case, the detection result region is obtained based on the detection probability value, and hence it can be said that the processor 36 specifies a face image in the processing object image based on the detection probability value found concerning the processing object image.

<Detection Probability Value Acquiring Processing>

Next, a detailed description will be provided on how to obtain a detection probability value. In the image detection section 14, the evaluation value map generating circuit 34 reads image data indicating a processing object image from the first storage circuit 32, and based on the image data, it generates an evaluation value map corresponding to the processing object image and made up of a plurality of evaluation values. Positions different from one another are allocated to the plurality of evaluation values constituting the evaluation value map, resulting in that the plurality of evaluation values are arrayed in the matrix form. In the image detection section 14, with use of this evaluation value map, a detection probability value concerning an image within the reference detection frame in the processing object image is obtained. Hereinafter, this evaluation value map corresponding to the processing object image and the reference detection frame may be especially referred to as a "reference evaluation value map".

Further, the evaluation value map generating circuit 34 reads image data indicating a size-changed image from the first storage circuit 32 or the second storage circuit 33, and based on the image data, it generates an evaluation value map corresponding to the size-changed image and made up of a plurality of evaluation values. Positions different from one another are also allocated to the plurality of evaluation values constituting this evaluation value map, resulting in that the plurality of evaluation values are arrayed in the matrix form. In the image detection section 14, with use of this evaluation value map, a detection probability value concerning an image within the size-changed frame in the size-changed image is obtained. Hereinafter, this evaluation value map corresponding to the size-changed image, namely this evaluation value map corresponding to the non-reference detection frame, may be especially referred to as a "non-reference evaluation value map". In the image detection section 14, a non-reference evaluation value map is generated concerning each of plural kinds of non-reference detection frames.

A plurality of evaluation values included in the reference evaluation value map respectively represent characteristics of a plurality of pixels included in the processing object image. That is, each evaluation value in the reference evaluation value map indicates a characteristic amount of the corresponding pixel in the processing object image.

Further, a plurality of evaluation values included in the non-reference evaluation value map respectively represent characteristics of a plurality of pixels included in the size-changed image corresponding to the non-reference evaluation value map. That is, each evaluation value in the non-reference evaluation value map indicates a characteristic amount of the corresponding pixel in the size-changed image.

In the present preferred embodiment, the evaluation value is a value indicating the relations that a pixel value of a target pixel has with a plurality of pixel values on the periphery of the target pixel. Hereinafter, the pixel value of the target pixel may be referred to as a "target pixel value". Further, the pixel value on the periphery of the target pixel may be referred to as a "peripheral pixel value". In the present preferred embodiment, for example, peripheral pixel values in eight directions on the periphery of the target pixel are used for acquirement of an evaluation value.

<Method for Generating Evaluation Value Map>

The reference evaluation value map is generated from the processing object image. The reference evaluation value map is configured of a plurality of evaluation values in total of ((M2−2)×(N2−2)), which are (M2−2) evaluation values arrayed in the row direction and (N2−2) evaluation values arrayed in the column direction, in the same manner as in the calculating processing object image. The plurality of evaluation values constituting the reference evaluation value map respectively represent characteristics of a plurality of pixels constituting the calculating processing object image. Specifically, the m×n-th evaluation value in the reference evaluation value map represents characteristics of the m×n-th pixel in the calculating processing object image. In the present preferred embodiment, each evaluation value in the reference evaluation value map shows the relations that a pixel value of a target pixel has with a plurality of peripheral pixels in a case where a pixel corresponding to the evaluation value is taken as the target pixel.

Further, a plurality of evaluation values, constituting the non-reference evaluation value map that corresponds to the non-reference detection frame and arranged in the matrix form, respectively represent characteristics of a plurality of pixels constituting a calculating size-changed image obtained by making smaller a size-changed image corresponding to the non-reference detection frame (a processing object image subjected to a size change just at the same ratio as a size change ratio of the non-reference detection frame) just by one pixel on the periphery. An array of the plurality of evaluation values in the non-reference evaluation value map is the same as an array of the plurality of pixels constituting the calculating size-changed image. The m×n-th evaluation value in the non-reference evaluation value map represents characteristics of the m×n-th pixel in the calculating size-changed image. In the present preferred embodiment, each evaluation value in the non-reference evaluation value map indicates the relations that a pixel value of a target pixel has with a plurality of peripheral pixels in a case where a pixel corresponding to the evaluation value is taken as the target pixel.

Figure 16:
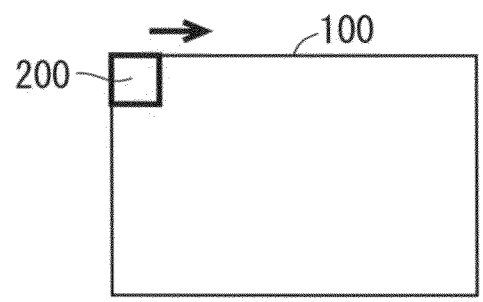
FIG. 16 is a diagram for explaining an operation of an evaluation value map generating circuit.

At the time of generating the reference evaluation value map, the evaluation value map generating circuit 34 sets a calculating frame 200 in a size of 3 p×3 p at the top left of the processing object image 100, as shown in FIG. 16. The evaluation value map generating circuit 34 then takes a pixel at the center of nine pixels within the calculating frame 200 as a target pixel.

Subsequently, the evaluation value map generating circuit 34 obtains an evaluation value indicating the relations between a pixel value of the target pixel and eight peripheral pixel values around the target pixel. As the eight peripheral pixel values, the evaluation value map generating circuit 34 uses a pixel value of a pixel on the top left of the target pixel, a pixel value of a pixel on the immediate top thereof, a pixel value of a pixel on the top right thereof, a pixel value of a pixel on the right thereof, a pixel value of a pixel on the bottom right thereof, a pixel value of a pixel on the immediate bottom thereof, a pixel value of a pixel on the bottom left thereof, and a pixel value of a pixel on the left thereof. In the present preferred embodiment, the evaluation value is represented by eight bits. Then, the evaluation value map generating circuit 34 takes the found evaluation value as the 1×1-th value of the reference evaluation value map which represents characteristics of a pixel at the center within the calculating frame 200, namely the 1×1-th pixel of the calculating processing object image. As the evaluation value, for example, LBP or LTP may be used. A detailed description will be provided on how to obtain LBP and LTP.

Figure 17:
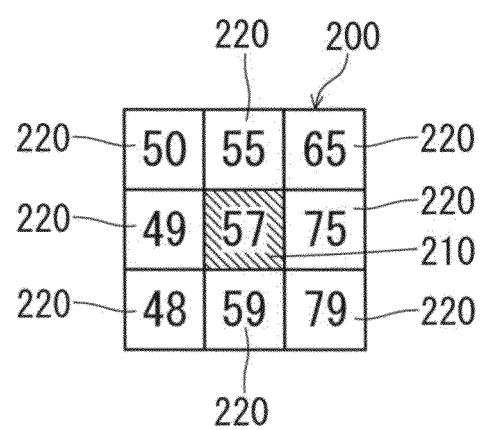
FIG. 17 is a diagram showing an example of a target pixel value and a plurality of peripheral pixel values.

FIG. 17 is a diagram showing an example of a pixel value concerning nine pixels within the calculating frame 200. In the present preferred embodiment, a pixel value to be used in acquirement of an evaluation value is, for example, a luminance. Further, in the present preferred embodiment, the pixel value is represented by eight bits. Hence the pixel value takes a value from "0" to "255" when represented by a decimal number. In addition, the pixel value may be a color difference component. Hereinafter, a value such as a pixel value will be a value represented by a decimal number unless otherwise stated.

In the example of FIG. 17, a target pixel value 210 is "57". Further, a pixel value of a pixel on the top left of the target pixel, a pixel value of a pixel on the immediate top thereof, a pixel value of a pixel on the top right thereof, a pixel value of a pixel on the right thereof, a pixel value of a pixel on the bottom right thereof, a pixel value of a pixel on the immediate bottom thereof, a pixel value of a pixel on the bottom left thereof and a pixel value of a pixel on the left thereof are respectively "50", "55", "65", "75", "79" "59", "48" and "49".

When obtaining an evaluation value corresponding to the calculating frame 200 located at the left top of the processing object image 100, the evaluation value map generating circuit 34 moves the calculating frame 200 to the right just by one pixel in the processing object image 100. Next, the evaluation value map generating circuit 34 then takes a pixel at the center of nine pixels within the moved calculating frame 200 as a target pixel, and obtains an evaluation value indicating the relations that the target pixel value has with eight peripheral pixel values. Then, the evaluation value map generating circuit 34 takes the found evaluation value as the 1×2-th value of the reference evaluation value map which represents characteristics of a pixel at the center within the calculating frame 200 after moved, namely the 1×2-th pixel of the calculating processing object image.

The evaluation value map generating circuit 34 further moves the calculating frame 200 to the right just by one pixel in the processing object image 100. Next, the evaluation value map generating circuit 34 then takes a pixel at the center of nine pixels within the moved calculating frame 200 as a target pixel, and obtains an evaluation value indicating the relations that the target pixel value has with eight peripheral pixel values. Then, the evaluation value map generating circuit 34 takes the found evaluation value as the 1×3-th value of the reference evaluation value map which represents characteristics of a pixel at the center within the calculating frame 200 after moved, namely the 1×3-th pixel of the calculating processing object image.

Thereafter, the evaluation value map generating circuit 34 makes the calculating frame 200 raster-scanned by each one pixel to the bottom right of the processing object image 100, and takes a pixel at the center of the calculating frame 200 as a target pixel to obtain an evaluation value at each position of the calculating frame 200. Hence a plurality of evaluation values respectively representing characteristics of a plurality of pixels constituting the calculating processing object image, namely a plurality of pixels except for peripheral one pixels in the processing object image, are generated, to complete a reference evaluation value map made up of the plurality of evaluation values. The evaluation value map generating circuit 34 stores the generated reference evaluation value map into the storage circuit 35. It is to be noted that, as for the peripheral one pixels of the processing object image, each of those pixels does not become a target pixel, and hence an evaluation value representing each of those pixels cannot be found.

At the time of generating the non-reference evaluation value map corresponding to the non-reference detection frame, the evaluation value map generating circuit 34 sets the calculating frame 200 in a size-changed image corresponding to the non-reference detection frame instead of setting the calculating frame 200 in the processing object image. Then in the same manner as above, while making the calculating frame 200 raster-scanned in the size-changed image by each one pixel, the evaluation value map generating circuit 34 makes an evaluation value at each position of the calculating frame 200. Hence a plurality of evaluation values respectively representing characteristics of a plurality of pixels constituting the calculating size-changed image that corresponds to the non-reference detection frame, namely a plurality of pixels except for peripheral one pixels in the size-changed image that corresponds to the non-reference detection frame, are generated to complete a non-reference evaluation value map made up of the plurality of evaluation values and corresponding to the non-reference detection frame. By sequentially reading image data indicating size-changed images from the storage section 31, the evaluation value map generating circuit 34 generates a plurality of non-reference evaluation value maps respectively corresponding to plural kinds of non-reference detection frames. The evaluation value map generating circuit 34 stores the generated non-reference evaluation value map into the storage circuit 35. It is to be noted that, as for the peripheral one pixels of the size-changed image, each of those pixels does not become a target pixel, and hence an evaluation value representing characteristics of each of those pixels cannot be found.

<Specific Examples of Evaluation Value>

Next, LBP and LTP used as an evaluation value will be described.

<LBP>

When LBP is to be generated, one bit (hereinafter referred to as "relation display bit") indicating the relation between each of a plurality of peripheral pixel values and a target pixel value is generated concerning each peripheral pixel value. A value of the relation display bit is taken as "1" when a difference value obtained by subtracting the target pixel value from the peripheral pixel value is not smaller than zero, and a value of the relation display bit is taken as "0" when the difference value is smaller than zero. Then, an eight-bit binary code (hereinafter referred to as "relation display code") made up of the plurality of relation display bits obtained concerning the plurality of peripheral pixel values becomes LBP, and the LBP is taken as an evaluation value. Specifically, a value representing the relation display code as the LBP by a decimal number is taken as an evaluation value.

Figure 18:
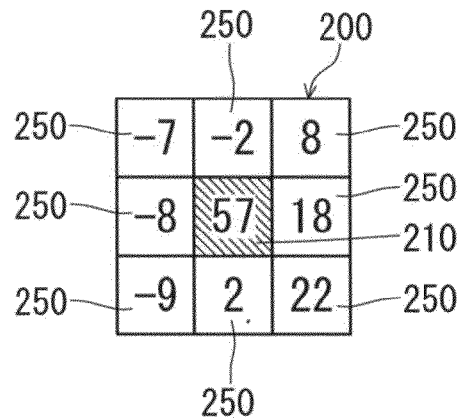
FIGS. 18 and 19 are diagrams each for explaining a method for generating LBP.
Figure 19:
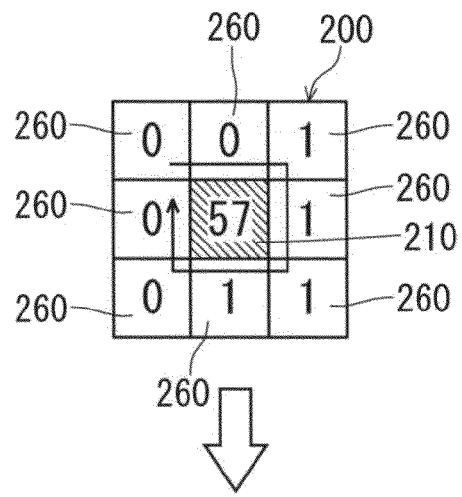

For example, it is assumed that the target pixel value 210 and a plurality of peripheral pixels 220 as shown in FIG. 17 are obtained concerning the plurality of peripheral pixels within the calculating frame 200. The evaluation value map generating circuit 34 obtains a difference value 250 concerning each peripheral pixel value 220, which is obtained by subtracting the target pixel value 210 from the peripheral pixel value 220. As shown in FIG. 18, the difference values 250 between the target pixel value 210 and the peripheral pixels 220 on the top left, the immediate top, the top right, the right, the bottom right, the immediately bottom, the bottom left and the left are respectively "−7", "−2", "8", "18", "22", "2", "−9" and "−8". Then, the evaluation value map generating circuit 34 compares each of the found plurality of difference values 250 (eight difference values 250 in the present example) with zero. The evaluation value map generating circuit 34 takes a value of a relation display bit 260 concerning the peripheral pixel value 220 as "1" when the difference value 250 concerning the peripheral pixel value 220 is not smaller than zero, and takes a value of the relation display bit 260 concerning the peripheral pixel value 220 as "0" when the difference value 250 is smaller than zero. In the example of FIG. 18, as shown in FIG. 19, the relation display bit 260 concerning the peripheral pixel value 220 on the top left, the immediate top, the top right, the right, the bottom right, the immediately bottom, the bottom left and the left are respectively "0", "0", "1", "1", "1", "1", "0" and "0". Then, the evaluation value map generating circuit 34 arrays the plurality of relation display bits 260 found concerning the plurality of peripheral pixels 220 in a predetermined order, to generate an eight-bit relation display code as the LBP. When obtaining the relation display code, the evaluation value map generating circuit 34 takes a value representing the relation display code by a decimal number as an evaluation value representing characteristics of the target pixel. In the present preferred embodiment, for example, the obtained eight relation display bits 260 are arrayed in the order of the relation display bit 260 of the peripheral pixel value 220 on the top left, the relation display bit 260 of the peripheral pixel value 220 on the immediate top, the relation display bit 260 of the peripheral pixel value 220 on the top right, the relation display bit 260 of the peripheral pixel value 220 on the right, the relation display bit 260 of the peripheral pixel value 220 on the bottom right, the relation display bit 260 of the peripheral pixel value 220 on the immediate bottom, the relation display bit 260 of the peripheral pixel value 220 on the bottom left and the relation display bit 260 of the peripheral pixel value 220 on the left, to generate the relation display code. In the example of the pixel values of FIG. 17, as shown in FIG. 19, "00111100" becomes the relation display code, and a value "60" representing it by a decimal number becomes the evaluation value representing characteristics of the target pixel.

As is understandable from the above description, the LBP can be said to indicate a state (distribution state) of pixel values on the periphery of the target pixel. Hence the LBP can be said to indicate a local texture. Hereinafter, an evaluation value map with LBP (to be exact, a value representing it by a decimal number) taken as each evaluation value is referred to as an "LBP map".

Figure 20:
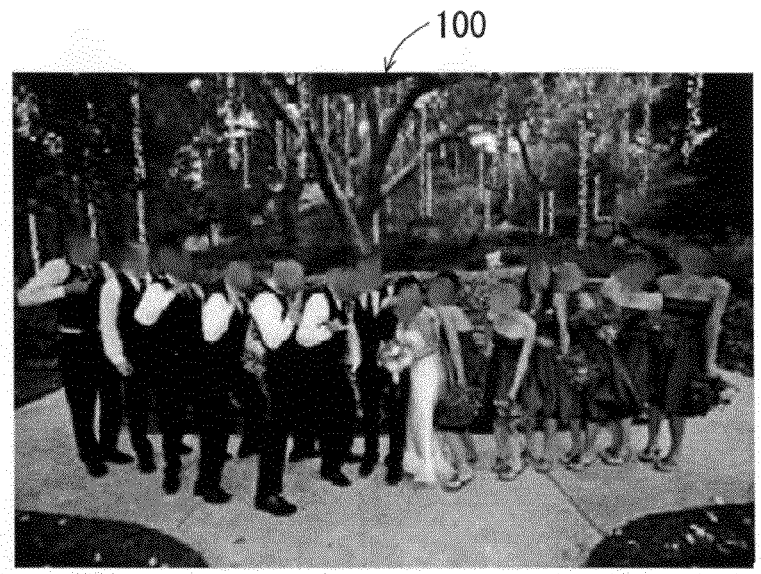
FIG. 20 is a view showing an example of the processing object image.
Figure 21:
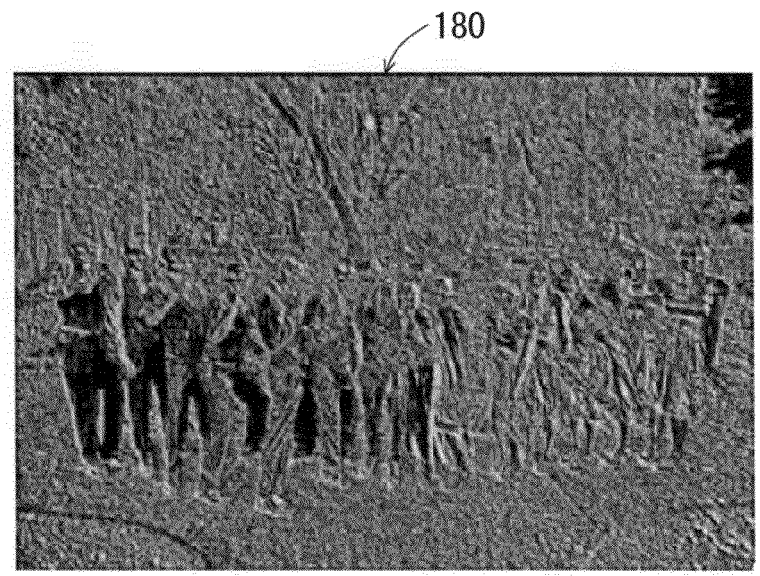
FIG. 21 is a view showing an example of an LBP map image.

FIG. 20 is a view showing one example of the processing object image 100. FIG. 21 is a view showing an example of a grayscale LBP map image 180 obtained by imaging the LBP map, generated based on the processing object image 100 shown in FIG. 20, by taking as a luminance each evaluation value in the LBP map. A texture concerning the processing object image 100 can be read from the LBP map image 180 shown in FIG. 21.

<LTP>

Differently from the LBP, when LTP is to be generated, ternary data indicating the relation between each of a plurality of peripheral pixel values and a target pixel value is generated concerning each peripheral pixel value. Here, in the LTP, an offset value is used when the ternary data indicating the relation between each of the peripheral pixel values and the target pixel value is generated in order to suppress an effect of a noise.

Specifically, when the absolute value of the difference value between the peripheral pixel value and the target pixel value is smaller than a predetermined offset value, a value of ternary data is taken as "0". Further, when the absolute value of the difference value between the peripheral pixel value and the target pixel value is not smaller than the predetermined offset value and the peripheral pixel value is larger than the target pixel value, the value of the ternary data is taken as "1". That is, when the peripheral pixel value is not smaller than a value obtained by adding the offset value to the target pixel value, the value of ternary data is taken as "1". Further, when the absolute value of the difference value between the peripheral pixel value and the target pixel value is not smaller than the predetermined offset value and the peripheral pixel value is smaller than the target pixel value, the value of the ternary data is taken as "−1". That is, when the peripheral pixel value is not larger than a value obtained by subtracting just the offset value from the target pixel value, the value of ternary data is taken as "−1". The offset value is set as "5", for example.

As thus described, by provision of the offset value at the time of determination of the magnitude correlation between the target pixel value and the peripheral pixel value, even when at least one of the target pixel value and the peripheral pixel value is affected by noise, it is possible to suppress erroneous determination of the magnitude correlation.

The LTP is a ternary code obtained by arraying, in a predetermined order, a plurality of ternary data found concerning a plurality of peripheral pixel values. For example, a ternary data code, obtained by arraying the ternary data in the order of the ternary data of the peripheral pixel value on the top left, the ternary data of the peripheral pixel value on the immediate top, the ternary data of the peripheral pixel value on the top right, the ternary data of the peripheral pixel value on the right, the ternary data of the peripheral pixel value on the bottom right, the ternary data of the peripheral pixel value on the immediate bottom, the ternary data of the peripheral pixel value on the bottom left and the ternary data of the peripheral pixel value on the left, is taken as the LTP.

Figure 22:
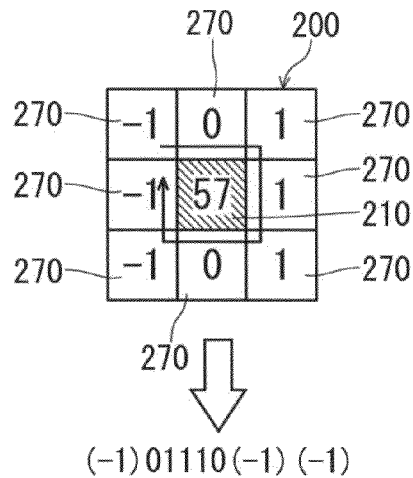
FIG. 22 is a diagram for explaining a method for generating LTP.

FIG. 22 is a diagram showing a plurality of ternary data 270 respectively corresponding to a plurality of peripheral pixels values 220 in a case where the target pixel value 210 and the plurality of peripheral pixels values 220 as shown in FIG. 17 above are obtained. In the example of FIG. 22, the LTP is (−1)01110(−1)(−1).

When the LTP is used as an evaluation value, the LTP is not used as it is, but either one of a positive LTP and a negative LTP obtained from the LTP is used.

Figure 23:
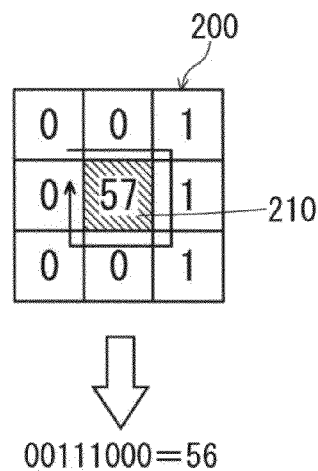
FIG. 23 is a diagram for explaining a method for generating positive LTP.

The positive LTP is one obtained by focusing attention only on "1" included in the LTP and converting the LTP to a binary code. Specifically, in the LTP, values other than "1" are all converted to "0", and a binary code obtained thereby becomes the positive LTP. FIG. 23 is a diagram showing a positive LTP corresponding to the LTP shown in FIG. 22. In the LTP shown in FIG. 22, namely (−1)01110(−1)(−1), when the values other than "1" are all converted to "0", a positive LTP "00111000" is obtained as shown in FIG. 23. Eight bits constituting the positive LTP respectively correspond to, sequentially from the high-order digit, the peripheral pixel value on the top left, the peripheral pixel value on the immediate top, the peripheral pixel value on the top right, the peripheral pixel value on the right, the peripheral pixel value on the bottom right, the peripheral pixel value on the immediate bottom, the peripheral pixel value on the bottom left and the peripheral pixel value on the left.

As is understandable from the above description, each bit of the positive LTP indicates the relation between the peripheral pixel value and a target pixel value corresponding to the bit. Then, each bit of the positive LTP is taken as "1" when the peripheral pixel value corresponding thereto is not smaller than a value obtained by adding just the offset value to the target pixel value, and it is taken as "0" when the peripheral pixel value is smaller than the obtained value. It can thus be said that the positive LTP indicates a state (distribution state) of pixel values, larger than the pixel value of the target pixel, on the periphery of the target pixel. Therefore, similarly to the LBP, the positive LTP can also be said to indicate a local texture. The evaluation value map generating circuit 34 uses a value representing the positive LTP by a decimal number as an evaluation value. In the example of FIG. 23, a value "56", representing the binary code "00111000" by a decimal number, is taken as the evaluation value. Hereinafter, an evaluation value map with a positive LTP (to be exact, a value representing it by a decimal number) taken as each evaluation value is referred to as a "positive LTP map".

Figure 24:
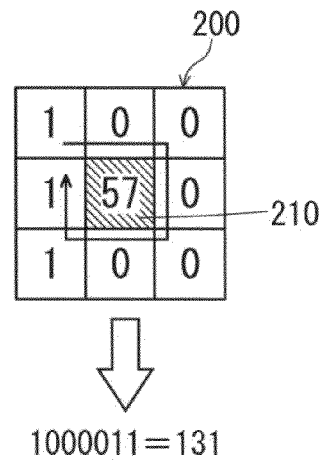
FIG. 24 is a diagram for explaining a method for generating negative LTP.

On the other hand, the negative LTP is one obtained by focusing attention only on "−1" included in the LTP and converting the LTP to a binary code. Specifically, in the LTP, the values other than "4" are all converted to "0", "−1" is converted to "1", and a binary code obtained thereby becomes the negative LTP. FIG. 24 is a diagram showing a negative LTP corresponding to the LTP shown in FIG. 22. In the LTP shown in FIG. 22, namely (−1)01110(−1)(−1), when "−1" is converted to "1" while the values other than "−1" are all converted to "0", a negative LTP "10000011" is obtained as shown in FIG. 24. Eight bits constituting the negative LTP respectively correspond to, sequentially from the high-order digit, the peripheral pixel value on the top left, the peripheral pixel value on the immediate top, the peripheral pixel value on the top right, the peripheral pixel value on the right, the peripheral pixel value on the bottom right, the peripheral pixel value on the immediate bottom, the peripheral pixel value on the bottom left and the peripheral pixel value on the left.

As is understandable from the above description, each bit of the negative LTP also indicates the relation between the peripheral pixel value and a target pixel value corresponding to the bit. Then, each bit of the negative LTP is taken as "1" when the peripheral pixel value corresponding thereto is not larger than a value obtained by subtracting just the offset value from the target pixel value, and it is taken as "0" when the peripheral pixel value is larger than the obtained value. It can thus be said that the negative LTP indicates a state (distribution state) of pixel values, smaller than the pixel value of the target pixel, on the periphery of the target pixel. Therefore, similarly to the LBP and the positive LTP, the negative LTP can also be said to indicate a local texture. The evaluation value map generating circuit 34 uses a value representing the negative LTP by a decimal number as an evaluation value. In the example of FIG. 24, a value "131" representing the binary code "10000011" by a decimal number is taken as the evaluation value. Hereinafter, an evaluation value map with a negative LTP (to be exact, a value representing it by a decimal number) taken as each evaluation value is referred to as a "negative LTP map".

Figure 25:
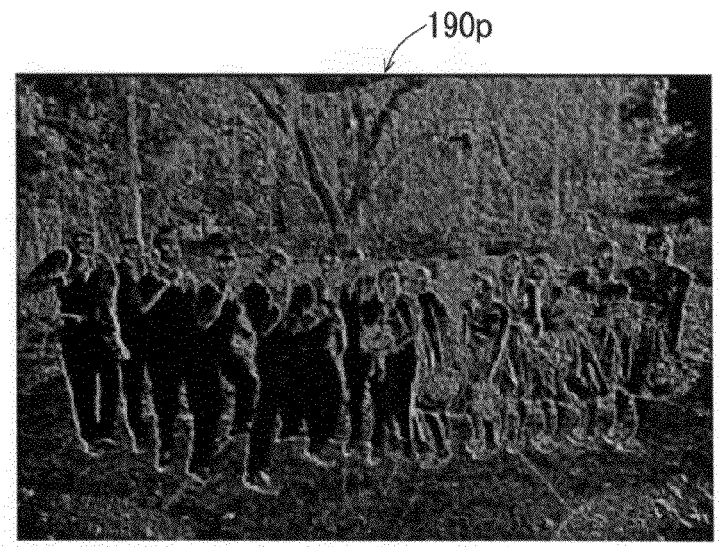
FIG. 25 is a view showing an example of a positive LTP map image.
Figure 26:
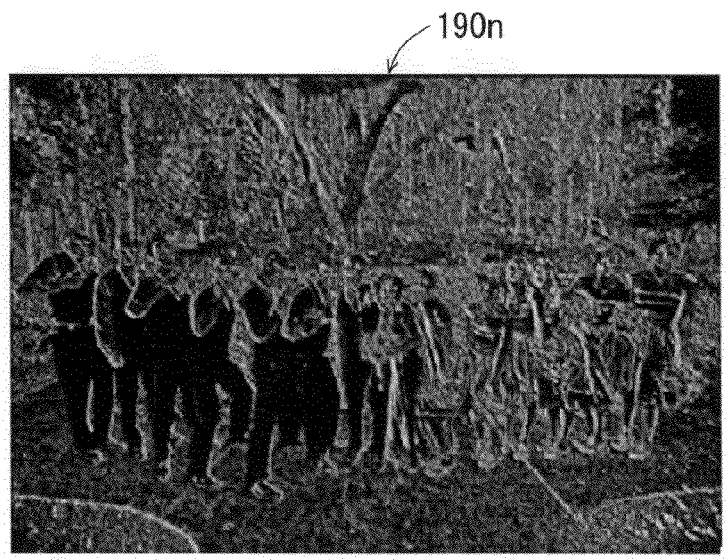
FIG. 26 is a view showing an example of a negative LTP map image.

FIG. 25 is a view showing an example of a grayscale positive LTP map image 190p obtained by imaging the positive LTP map, generated based on the processing object image 100 shown in FIG. 20, by taking as a luminance each evaluation value in the positive LTP map. FIG. 26 is a view showing an example of a grayscale negative LTP map image 190n obtained by imaging the negative LTP map, generated based on the processing object image 100 shown in FIG. 20, by taking as a luminance each evaluation value in the negative LTP map. A texture concerning the processing object image 100 can be read from the positive LTP map image 190p shown in FIG. 25 and the negative LTP map image 190n shown in FIG. 26.

Hereinafter, when it is not particularly necessary to distinguish the LBP, the negative LTP and the positive LTP, each one may be referred to as a "texture representing code".

<About "Uniform">

As described above, in the present preferred embodiment, the evaluation value is represented by eight bits, and hence it can take 256 kinds of values from 0 to 255.

On the other hand, as is understandable from the later-mentioned description, a processing amount in processing to obtain a detection probability value concerning an image within the frame depends on the number of kinds of values that the evaluation value can take. Therefore, to limit the number of kinds of values that the evaluation value can take is effective for reducing the processing amount in the image detection section 14.

Thereat, an idea of "uniform", which may be used at the time of obtaining LBP or LTP, is used to consider limiting (reducing) the number of kinds of values that the evaluation value can take. Hereinafter, there will be described limit of the number of kinds of values that the evaluation value can take, with use of "uniform".

First, the number of times of bit change (bit inversion) at the time of sequentially looking at eight bits constituting a texture representing code such as LBP. A direction in which the eight bits constituting the texture representing code are looked at may be a direction from the high-order digit to the low-order digit or may be a direction from the low-order digit to the high-order digit. Then, when the number of times of bit change found concerning the texture representing code is not larger than two, the texture representing code is taken as being "uniform". On the other hand, when the number of times of bit change found concerning the texture representing code exceeds two, namely the number of times is not smaller than three, the texture representing code is taken as not being "uniform".

As for the texture representing code taken as being "uniform", a value representing the texture representing code by a decimal number is taken as an evaluation value.

On the other hand, the texture representing code taken as not being "uniform" is taken as one generated based on a target pixel value and a peripheral pixel value affected by noise and will not be used as an evaluation value. The texture representing code taken as not being "uniform" is converted to an eight-bit specific binary code, and a value representing the specific binary code by a decimal number is taken as an evaluation value. This specific binary code can be any one so long as being an eight-bit binary code other than an eight-bit binary code taken as being "uniform". For example, "10101010" is adopted as the specific binary code.

For example, it is assumed that the texture representing code is "01000000". When "01000000" is looked at sequentially from the high-order digit, for example, a change is made from "0" to "1" between the first bit and the second bit from the high-order digit, and a change is then made from "1" to "0" from the second bit to the third bit from the high-order bit. Therefore, with the bit change made twice, "01000000" becomes "uniform", and a value "64" representing "01000000" by a decimal number is taken as an evaluation value.

Further, it is assumed that the texture representing code is "00001111". When it is looked at sequentially from the high-order digit, a change is made from "0" to "1" between the fourth bit and the fifth bit from the high-order bit, and the bit change is made once. Therefore, "00001111" becomes "uniform", and a value "15" representing "00001111" by a decimal number is taken as an evaluation value.

Moreover, it is assumed that the texture representing code is "00110011". When it is looked at sequentially from the high-order digit, for example, a change is made from "0" to "1" between the second bit and the third bit from the high-order bit, a change is then made from "1" to "0" from the fourth bit and the fifth bit from the high-order bit, and a change is made from "0" to "1" between the sixth bit and the seventh bit from the high-order bit. Therefore, with the bit change made three times, "00110011" is taken as not being "uniform". Hence "00110011" is converted to a specific binary code "10101010", and a value "170" representing "10101010" by a decimal number is taken as an evaluation value.

Furthermore, it is assumed that the texture representing code is "01010101". When it is sequentially looked at, the bit change is made seven times, and "01010101" is thus taken as not being "uniform". Hence "01010101" is converted to a specific binary code "10101010", and a value "170" representing "10101010" by a decimal number is taken as an evaluation value.

As thus described, a texture representing code is converted to a specific binary code when the number of times of bit change at the time of sequentially looking at eight bits that constitute the texture representing code exceeds two, and a value representing the specific binary code by a decimal number is taken as an evaluation value, thereby to limit the number of kinds of values that the evaluation value can take from 256 to 59.

The evaluation value map generating circuit 34 according to the present preferred embodiment limits the number of kinds of values that the evaluation value can take to 59 with use of "uniform" so as to reduce a processing amount.

It is to be noted that, for convenience of description, numbers 0 to 58 are respectively allocated to 59 kinds of values that the evaluation value can take. Hereinafter, the evaluation value may be described using this number.

<About Pixel Value Interpolation>

In order to improve the accuracy in evaluation value, as a plurality of peripheral pixel values used for obtaining an evaluation value, a use of peripheral pixel values at a plurality of peripheral positions with the same distance from a target pixel is more preferable.

On the other hand, in generation of LBP, a "distance from a target point" is used as a parameter indicating the degree of distance from the target pixel in comparison of the peripheral pixel value with the target pixel value. When the distance from the target point is "1", LBP is found with use of eight peripheral pixel value as described above. The distance 1 indicates a distance between pixels in the vertical direction and the horizontal direction. It is to be noted that the same also applies to LTP.

Figure 27:
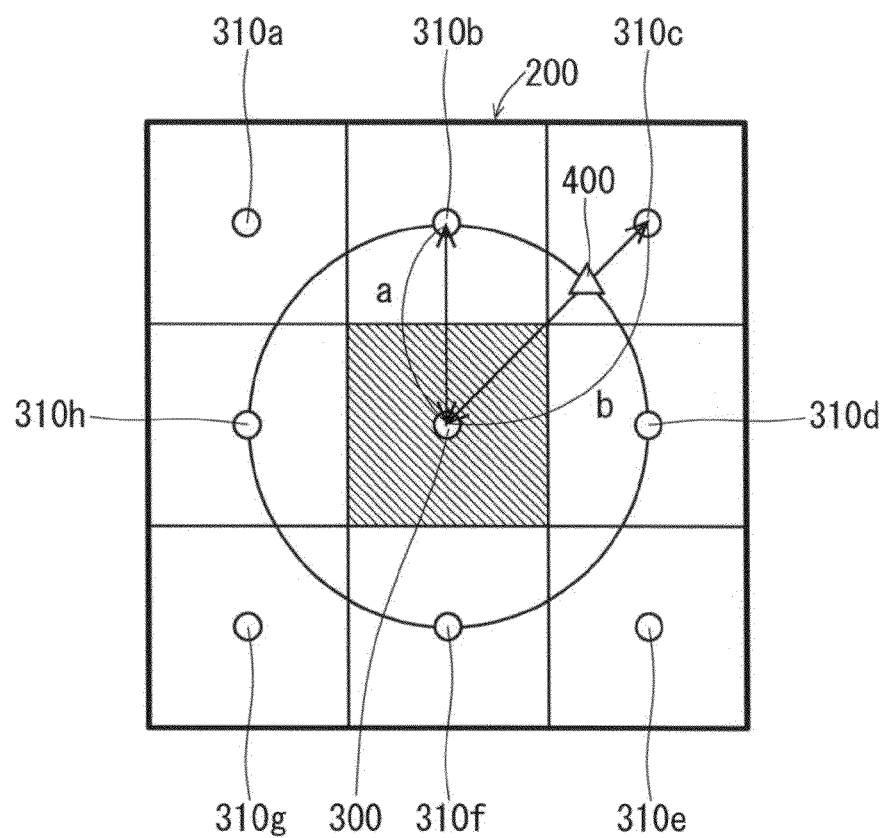
FIG. 27 is a diagram showing a positional relation between a target pixel and each of a plurality of peripheral pixels.

FIG. 27 is a diagram showing a positional relation between a target pixel 300 and each of eight peripheral pixels 310a to 310h within the calculating frame 200. As shown in FIG. 27, as for each of the nine pixels within the calculating frame 200, a distance a between the target pixel 300 and the peripheral pixel in the vertical direction or the horizontal direction is different from a distance b between the target pixel 300 and the peripheral pixel in an oblique direction.

As described above, when pixel values of the eight peripheral pixels 310a to 310h existing on the periphery of the target pixel 300 are used as the eight peripheral pixel values to be used at the time of obtaining an evaluation value, the distance between the target pixel and the position to which the peripheral pixel value corresponds is "1" in the vertical direction and the horizontal direction, but is not "1" in the oblique direction. Hence in this case, a plurality of peripheral pixel values to be used in acquirement of an evaluation value are not peripheral pixel values at a plurality of peripheral positions with the same distance from the target pixel.

Therefore, as for the peripheral pixel value in the oblique direction, it is desirable to use a pixel value at a peripheral position 400 in an oblique direction (see FIG. 27) with a distance from the target pixel being "1" instead of using the pixel value of the peripheral pixel in the oblique direction.

The pixel value at the peripheral position 400 in the oblique direction with a distance from the target pixel being "1" can be obtained by pixel value interpolation processing such as bilinear interpolation processing.

Figure 28:
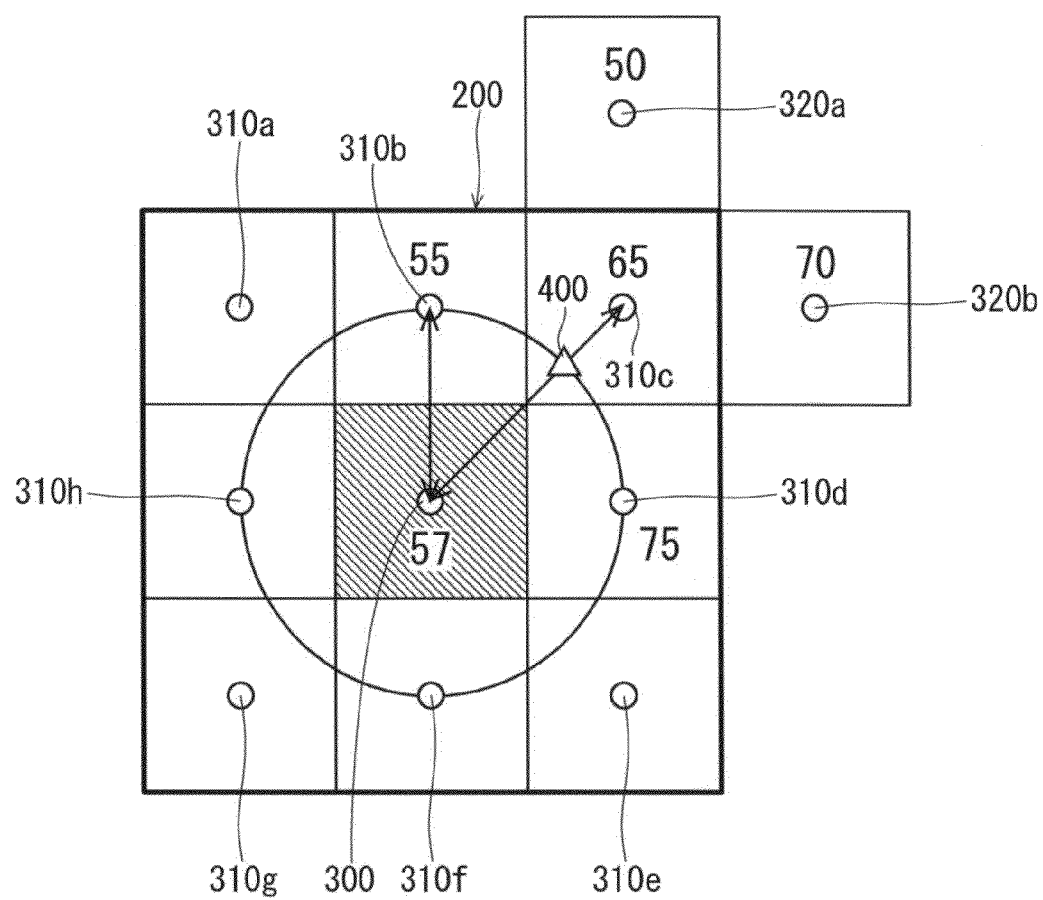
FIG. 28 is a diagram for explaining a method for obtaining a pixel value at a peripheral position in an oblique direction with a distance from the target pixel being "1"

FIG. 28 is a diagram for explaining a method for obtaining a pixel value at the peripheral position 400 in a direction to the top right with a distance from the target pixel being "1", with use of the bilinear interpolation processing. In the example of FIG. 28, a pixel value of the target pixel 300, a pixel value of the peripheral pixel 310b in an upward direction, a pixel value of the peripheral pixel 310c in a direction to the top right, and a pixel value of the peripheral pixel 310d in a direction to the right are respectively "57", "55", "65" and "75". Further, a pixel value of a pixel 320a existing in an upward direction from the peripheral pixel 310c is "50", and a pixel value of a pixel 320b existing in a direction to the right from the pixel 310c is "70".

In the example of FIG. 28, assuming that a ratio of a distance between the target peripheral position 400 and the pixel 320a in the vertical direction to a distance between the peripheral position 400 and the peripheral pixel 310d in the vertical direction is y1:y2, an interpolated value Y0 in the vertical direction is found with use of the following formula (1):

[Mathematical Formula 1]

$$Y0 = 75 \times y1/(y1+y2) + 50 \times y2/(y1+y2) \quad (1)$$

Further, assuming that a ratio of a distance between the target peripheral position 400 and the peripheral pixel 310b in the horizontal direction to a distance between the peripheral position 400 and the pixel 320b in the horizontal direction is x1:x2, an interpolated value X0 in the horizontal direction is found with use of the following formula (2):

[Mathematical Formula 2]

$$X0 = 70 \times x1/(x1+x2) + 55 \times x2/(x1+x2) \quad (2)$$

Then, a pixel value Z0 at the peripheral position 400 is found with use of the following formula (3):

[Mathematical Formula 3]

$$Z0 = (X0+Y0)/2 \quad (3)$$

A pixel value at the peripheral position in a direction to the top left with a distance from the target pixel being "1", a pixel value at the peripheral position in a direction to the bottom left with a distance from the target pixel being "1" and a pixel value at the peripheral position in a direction to the bottom right with a distance from the target pixel being "1" can also be found in the same manner as above.

At the time of obtaining an evaluation value, it is possible to obtain a more accurate evaluation value by using a pixel value at the peripheral position in the oblique direction with a distance from the target pixel being "1" instead of using a pixel value of a peripheral pixel value existing in the oblique direction from the target pixel. As the peripheral pixel value, the evaluation value map generating circuit 34 may use the pixel value of the peripheral pixel value in the oblique direction or use the pixel value at the peripheral position in the oblique direction with a distance from the target pixel being "1".

As described above, in the present preferred embodiment, although the evaluation value map generating circuit 34 uses eight pixel values on the periphery of the target pixel at the time of obtaining the evaluation value, it may not use the peripheral pixel value in the oblique direction with respect to the target pixel. For example, the evaluation value map generating circuit 34 may not use all of the peripheral pixel values in the directions to the top right, the top left, the bottom right and the bottom left with respect to the target pixel. Therefore, in acquirement of the evaluation value, only the peripheral pixel values in the upward direction, the downward direction, the direction to the right and the direction to the left are used, and hence the evaluation value is represented by four bits from eight bits, leading to reduction in information amount of the evaluation value. This allows reduction in processing amount concerning processing with use of the evaluation value. It is to be noted that by not using at least one peripheral pixel value out of the peripheral pixel values in the directions to the top right, the top left, the bottom right and the bottom left, it is possible to reduce the number of kinds of values that the evaluation value can take.

Further, when the peripheral pixel value in the oblique direction is not to be used in acquirement of the evaluation value, the processing amount is further reduced since there is no need for obtaining a pixel value at the peripheral position in the oblique direction with a distance from the target pixel being "1 by the pixel value interpolation processing.

Moreover, when the peripheral pixel values in the directions to the top right, the top left, the bottom right and the bottom left are all not to be used in acquirement of the evaluation value, since the evaluation value is represented by four bits, not a large effect is exerted even if the kinds of values that the evaluation value can take are limited with use of "uniform" as described above. Hence in this case, the kinds of values that the evaluation value can take are prevented from being limited with use of "uniform". That is, the evaluation value map generating circuit 34 uses, as the evaluation value, a texture representing code made up of a plurality of bits (four bits) (to be exact, a value representing it by a decimal number) regardless of the number of times of bit change at the time of sequentially looking at the plurality of bits. This makes it unnecessary to perform processing for limiting the kinds of values that the evaluation value can take, thereby leading to reduction in processing amount in the evaluation value map generating circuit 34.

<Characteristic Amount Acquiring Processing>

In the present preferred embodiment, the image detection section 14 acquires a characteristic amount of a processing object image from a reference evaluation value map, and obtains a detection probability value concerning the processing object image with use of the characteristic amount. Further, the image detection section 14 acquires a characteristic amount of a size-changed image from a non-reference evaluation value map, and obtains a detection probability value concerning the size-changed image with use of the characteristic amount.

At the time of acquiring the characteristic amount of the processing object image, the image detection section 14 uses a calculating processing object image which is smaller than the original size just by one pixel on the periphery. Further, at the time of acquiring the characteristic amount of the size-changed image, the image detection section 14 uses a size-changed image which is smaller than the original size just by one pixel on the periphery. Hereinafter, a calculating processing object image and a calculating size-changed image to be used in acquirement of the characteristic amount may be collectively referred to as an "acquirement object image".

In the present preferred embodiment, when the characteristic amount is roughly classified, for example, two kinds of characteristic amounts are used. Specifically, one evaluation value within the probability value acquirement frame set in the evaluation value map is taken as one characteristic amount. Hereinafter, this characteristic amount is referred to as an "evaluation value single characteristic amount". In the present preferred embodiment, since the number of kinds of values that the evaluation value can take is 59 as described above, the number of kinds (dimensions) of the evaluation value single characteristic amount is 59.

Further, in the present preferred embodiment, a combination of two evaluation values within the probability value acquirement frame set in the evaluation value map is taken as one characteristic amount. Hereinafter, this characteristic amount is referred to as a "co-occurrence characteristic amount". It can be said that the co-occurrence characteristic amount indicates co-occurrence properties of the evaluation values.

The image detection section 14 obtains a detection probability value based on both an evaluation value single characteristic amount and a co-occurrence characteristic amount acquired from an image within the frame. Hereinafter, a method for acquiring the evaluation value single characteristic amount and the co-occurrence characteristic amount will be described in detail.

In such a manner as in FIGS. 6 to 9 described above, when setting a reference detection frame at a position where a calculating processing object image exists, the processor 36 reads a reference evaluation value map from the storage circuit 35, to set the reference detection frame at the same position as the above position in the reference evaluation value map. Then, the processor 36 outputs a plurality of evaluation values within the reference detection frame in the reference evaluation value map to the probability value acquiring circuit 37. With the size of the reference detection frame being 16 p×16 p, an evaluation value block made up of (16×16) evaluation values is inputted into the probability value acquiring circuit 37. The probability value acquiring circuit 37 takes each of the plurality of evaluation values constituting the inputted evaluation value block as an evaluation value single characteristic amount. Hence, from an image within the reference detection frame in the processing object image, the (16×16) evaluation value single characteristic amounts of the image are obtained.

Further, the probability value acquiring circuit 37 acquires a co-occurrence characteristic amount from the inputted evaluation value block. Specifically, the probability value acquiring circuit 37 acquires a plurality of pairs of combinations of two evaluation values being in a predetermined relative positional relation, and takes each of the plurality of pairs as a co-occurrence characteristic amount. Hereinafter a pair of two evaluation values being in the predetermined relative positional relation is referred to as an "evaluation value pair".

In the present preferred embodiment, K (≥2) kinds of positional relations have been decided concerning the relative positional relation between the two evaluation values constituting the evaluation value pair. Then in the present preferred embodiment, a plurality of evaluation value pairs, each made up of two evaluation values being in each of the K kinds of positional relations, are acquired concerning the respective positional relations from the evaluation value block. In the present preferred embodiment, for example, K=30, and 30 kinds of positional relations have been decided. Hereinafter, in the evaluation value pair, one evaluation value is referred to as a "first evaluation value", and the other evaluation value is referred to as a "second evaluation value".

Figure 29:
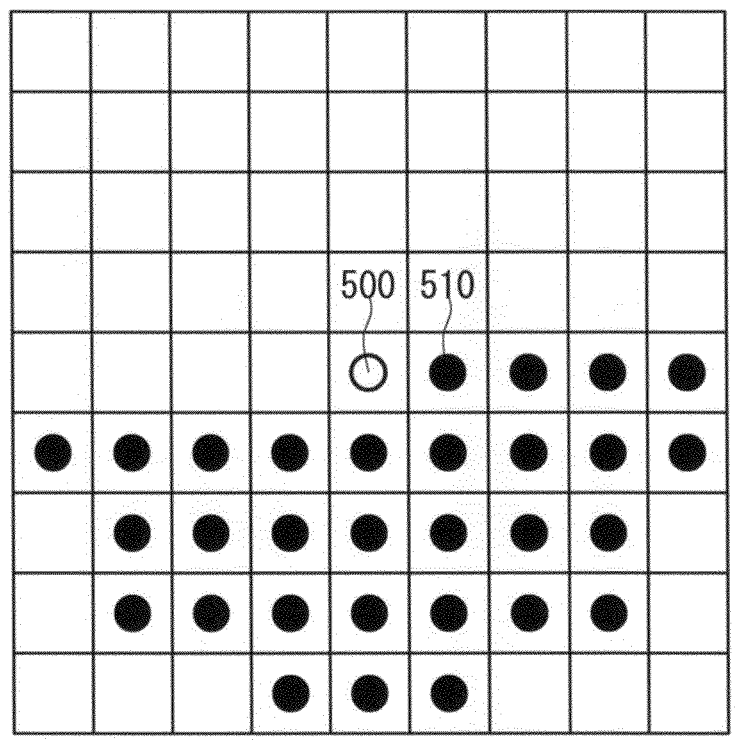
FIG. 29 is a diagram showing plural kinds of positional relations as to evaluation value pair.

FIG. 29 is a diagram showing an example of 30 kinds of positional relations as to evaluation value pairs. In FIG. 29, a white circle indicates a first evaluation value 500. Further in FIG. 29, a black circle indicates a second evaluation value 510, and 30 second evaluation values 510 are indicated which are located at different positions in an evaluation value block.

In the present preferred embodiment, a relative positional relation between the first evaluation value 500 shown in FIG. 29 and one second evaluation value 510 shown in FIG. 29 shows one kind of positional relation as to the evaluation value pair. In FIG. 29, due to the existence of 30 second evaluation values 510, 30 kinds of positional relations as to the evaluation value pair are indicated.

Figure 30:
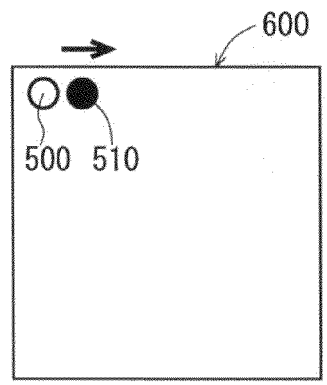
FIGS. 30 to 32 are diagrams each for explaining operations of a probability value acquiring circuit.
Figure 31:
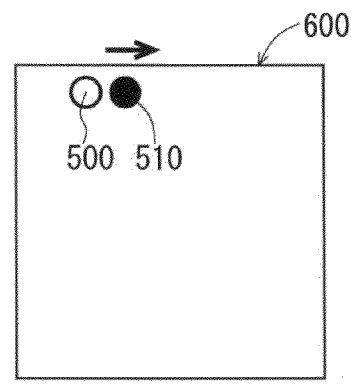
Figure 32:
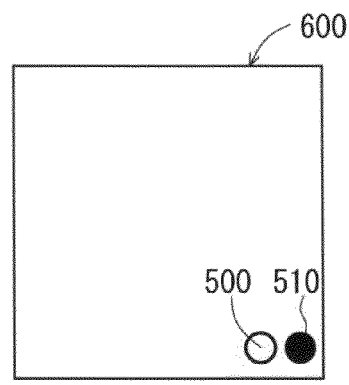

FIGS. 30 to 32 are diagrams for explaining an operation of the probability value acquiring circuit 37 at the time when the probability value acquiring circuit 37 acquires an evaluation value pair, made up of two evaluation values being in a certain relative positional relation, from an inputted evaluation value block 600. In each of the examples of FIGS. 30 to 32, an evaluation value pair, made up of the first evaluation value 500 and the second evaluation value 510 which are adjacent to each other in the horizontal direction, is acquired from the evaluation value block 600.

In the present preferred embodiment, in the evaluation value block 600, the probability value acquiring circuit 37 takes each of evaluation values as the first evaluation value 500 sequentially from the top left to the bottom right (along the raster-scanning direction), to acquire a combination of the first evaluation value 500 and the second evaluation value 510 that makes a pair with the first evaluation value 500.

Specifically, as shown in FIG. 30, first, the probability value acquiring circuit 37 takes an evaluation value at the top left in the evaluation value block 600 as the first evaluation value 500 and takes an evaluation value to the right thereof as the second evaluation value 510, to acquire a combination of the first evaluation value 500 and the second evaluation value 510 so as to take it as one co-occurrence characteristic amount.

Next, as shown in FIG. 31, the probability value acquiring circuit 37 takes an evaluation value which is the second from the top left in a direction to the right in the evaluation value block 600 as the first evaluation value 500 and takes an evaluation value to the right thereof as the second evaluation value 510, to acquire a combination of the first evaluation value 500 and the second evaluation value 510 so as to take it as one co-occurrence characteristic amount.

Hereinafter, the probability value acquiring circuit 37 takes each evaluation value in the evaluation value block 600 as the first evaluation value 500 sequentially along the raster-scanning direction, and takes an evaluation value to the right of the first evaluation value 500 as the second evaluation value 510, to acquire a combination of the first evaluation value 500 and the second evaluation value 510 that makes a pair therewith, concerning each first evaluation value 500. FIG. 32 shows a state where an evaluation value which is the second from the bottom right in the direction to the left in the evaluation value block 600 has been taken as the first evaluation value 500, and an evaluation value to the right thereof has been taken as the second evaluation value 510.

It is to be noted that at the time of the probability value acquiring circuit 37 taking each of evaluation values as the first evaluation value 500 sequentially from the top left to the bottom right to acquire a combination of the first evaluation value 500 and the second evaluation value 510 that makes a pair with the first evaluation value 500 in the evaluation value block 600, when the second evaluation value 510 that makes a pair with the first evaluation value 500 does not exist, there is not acquired a combination of the first evaluation value 500 and the second evaluation value 510 that makes a pair therewith. For example in the examples of FIGS. 30 to 32, when the evaluation value on the bottom right is taken as the first evaluation value 500 in the evaluation value block 600, the second evaluation value 510 that makes a pair therewith does not exist, and hence there is not acquired a combination of the first evaluation value 500 and the second evaluation value 510 that makes a pair therewith.

As described above, the probability value acquiring circuit 37 acquires a plurality of evaluation value pairs, each made up of the first evaluation value and the second evaluation value being in each of K kinds of positional relations, concerning the respective positional relations. Hence, from an image within the reference detection frame in the processing object image, a plurality of co-occurrence characteristic amounts concerning the image are acquired.

Since the number of kinds of values that the evaluation value can take here is 59, the number of kinds of combinations between the first evaluation value and the second evaluation value that constitute the evaluation value pair is (59×59). Then, even when the combination of the first evaluation value and the second evaluation value is the same among a plurality of evaluation value pairs, if the relative positional relations between the first evaluation value and the second evaluation value are different, those can be said to be different in terms of characteristic amount of the image. Therefore, in the present preferred embodiment where K=30, the number of kinds (dimensions) of co-occurrence characteristic amounts is (30× 59×59). Hence with the kinds of evaluation value single characteristic amounts and the kinds of co-occurrence characteristic amounts combined, the number of kinds (number of dimensions) of characteristic amounts acquired from the evaluation value block is 104489 (=59+30×59×59).

In the image detection section 14, at the time of the processor 36 making the reference detection frame raster-scanned in the calculating processing object image, the reference evaluation value map is used at each position of the reference detection frame as described above, and an evaluation value single characteristic amount and a co-occurrence characteristic amount are acquired from the image within the reference detection frame.

In the image detection section 14, even in the case of the non-reference detection frame being used, an evaluation value single characteristic amount and a co-occurrence characteristic amount are acquired in the same manner as above. When setting a size-changed detection frame at a certain position in a calculating size-changed image corresponding to the non-reference detection frame, the processor 36 sets at the same position as the certain position the size-changed detection frame in the non-reference evaluation value map corresponding to the non-reference detection frame and generated in the evaluation value map generating circuit 34. Then, the processor 36 inputs into the probability value acquiring circuit 37 the evaluation value block made up of a plurality of evaluation values within the size-changed detection frame set in the non-reference evaluation value map. The probability value acquiring circuit 37 acquires a plurality of evaluation value single characteristic amounts and a plurality of co-occurrence characteristic amounts from the inputted evaluation value block. Accordingly, the evaluation value single characteristic amount and the co-occurrence characteristic amount of the image are acquired from the image within the size-changed detection frame in the calculating size-changed image.

In the image detection section 14, at the time of the processor 36 making the size-changed detection frame raster-scanned in the calculating size-changed image, as described above, the non-reference evaluation value map is used at each position of the size-changed detection frame and an evaluation value single characteristic amount and a co-occurrence characteristic amount are acquired from the image within the size-changed detection frame. In the image detection section 14, concerning each of the plural kinds of non-reference detection frames, the size-changed detection frame corresponding to the non-reference detection frame is raster-scanned in the calculating size-changed image corresponding to the non-reference detection frame, and with use of the non-reference evaluation value map corresponding to the non-reference detection frame, the evaluation value single characteristic amount and the co-occurrence characteristic amount of the image are acquired from the image within the size-changed detection frame.

<About Details of Probability Value Acquiring Circuit>

Next, a configuration of the probability value acquiring circuit 37 and detection probability value calculating processing in the probability value acquiring circuit 37 will be described. Hereinafter, a method for calculating a detection probability value (hereinafter referred to as a "method for calculating a comparison object") which is different from the method for calculating a detection probability value in the probability value acquiring circuit 37 will be first described, and thereafter, the probability value acquiring circuit 37 will be described.

<Method for Calculating a Comparison Object>

In the method for calculating a comparison object, when a detection probability value concerning an image within the frame is to be found, there is generated a one-dimensional evaluation value histogram showing frequency distribution (number-of-times distribution) of evaluation values in the evaluation value block.

FIG. 33 is a diagram showing an example of the one-dimensional evaluation value histogram. A horizontal axis of FIG. 33 indicates numbers 0 to 58 respectively allocated to 59 kinds of values that the evaluation value can take. A vertical axis of FIG. 33 indicates a frequency of an evaluation value having a value of the number indicated on the horizontal axis. In the present preferred embodiment, since the number of kinds of values that the evaluation value can take is 59, the one-dimensional evaluation value histogram has 59 bins.

In the method for calculating a comparison object, when a one-dimensional evaluation value histogram is generated, each of the frequencies at the 59 bins in the one-dimensional evaluation value histogram is taken as a characteristic amount of the image within the frame. This characteristic amount is referred to as a "one-dimensional histogram characteristic amount". From the image within the frame, 59 one-dimensional histogram characteristic amounts of the image within the frame are acquired.

Further in the method for calculating a comparison object, when a detection probability value concerning an image within the frame is to be obtained, a two-dimensional histogram, showing frequency distribution concerning combinations of values that the evaluation value pair with the first and second evaluation values being in each of the K kinds of positional relations can take, is generated concerning the positional relation. When it is assumed that 30 kinds of positional relations have been decided as to the evaluation value pair, 30 two-dimensional evaluation value histograms are generated.

A two-dimensional evaluation value histogram concerning a certain evaluation value pair with the first and second evaluation values being in a certain positional relation is generated based on a plurality of evaluation value pairs acquired from the evaluation value block as in FIGS. 30 to 32 described above.

FIG. 34 is a diagram showing an example of the two-dimensional evaluation value histogram concerning an evaluation value pair (hereinafter referred to as "object evaluation value pair") with the first and second evaluation values being in a certain relative positional relation. A first axis along an X-direction of FIG. 34 indicates numbers 0 to 58 respectively allocated to 59 kinds of values that the first evaluation value of the object evaluation value pair can take. A second axis along a Y-direction of FIG. 34 indicates numbers 0 to 58 respectively allocated to 59 kinds of values that the second evaluation value of the object evaluation value pair can take. A third axis along a Z-direction of FIG. 34 indicates a frequency of a combination of the first evaluation value having a value of the number indicated on the first axis and the second evaluation value having a value of the number indicated on the second axis in the evaluation value. That is, the third axis of FIG. 34 indicates how many object evaluation value pairs exist, which are each made up of the first evaluation value having the value of the number indicated on the first axis and the second evaluation value having a value of the number indicated on the second axis, in a plurality of object evaluation value pairs obtained from the evaluation value block as in FIGS. 30 to 32 described above.

For example, in a plurality of object evaluation value pairs obtained from the evaluation value block, when there exist eight object evaluation value pairs made up of the first evaluation value having a value of number 0 and the second evaluation value having a value of number 2, a frequency at a bin corresponding to the number 0 indicated on the first axis and the number 2 indicated on the second axis is "8". Further, in the plurality of object evaluation value pairs obtained from the evaluation value block, when there exist three object evaluation value pairs made up of the first evaluation value having a value of number 2 and the second evaluation value having a value of number 1, a frequency at a bin corresponding to the number 2 indicated on the first axis and the number 1 indicated on the second axis is "3". In the present preferred embodiment, the two-dimensional histogram has 3481 (=59× 59) bins.

As thus described, in the method for calculating a comparison object, the two-dimensional evaluation value histogram is generated concerning each of K kinds of positional relations as to the evaluation value pair. This leads to generation of K two-dimensional evaluation value histograms.

In the method for calculating a comparison object, when K two-dimensional evaluation value histograms are generated, concerning each of the K two-dimensional evaluation value histograms, each of frequencies at 3481 bins in the two-dimensional evaluation value histogram is taken as a characteristic amount. This characteristic amount is referred to as a "two-dimensional histogram characteristic amount". In the present preferred embodiment with K=30, 104430 (=3481× 30) two-dimensional histogram characteristic amounts are obtained from the image within the frame.

In the method for calculating a comparison object, when 59 one-dimensional histogram characteristic amounts and 104430 two-dimensional histogram characteristic amounts are acquired from the image within the frame, there is generated a characteristic vector obtained by sequentially arraying these 104489 (=59+104430) characteristic amounts. The number of dimensions of the characteristic vector is "104489". Then, based on the generated characteristic vector and a weight vector generated on the basis of a learning sample (learning sample image) concerning a face image, there is calculated a detection probability value indicative of a probability that an image within the frame is a face image. The weight vector has been generated based on a characteristic vector made up of 59 one-dimensional histogram characteristic amounts and 104430 two-dimensional histogram characteristic amounts acquired from the learning sample in the same manner as above. In the method for calculating a comparison object, an inner product of a characteristic vector acquired from an image within the frame and a weight vector is found, and a value obtained thereby becomes a detection probability value concerning the image within the frame. That is, each of a plurality of characteristic amounts constituting the characteristic vector obtained from the image within the frame is multiplied by a weigh value (also referred to as "weigh coefficient", "learning data") corresponding to the characteristic amount by the weight vector. Then, the plurality of characteristic amounts multiplied by the weigh value are added, and the addition value is taken as a detection probability value.

Here, an inner product of the characteristic vector made up of 59 one-dimensional histogram characteristic amounts obtained from the one-dimensional evaluation value histogram and the weight vector made up of 59 weigh values respectively corresponding to the 59 one-dimensional histogram characteristic amounts is taken as a "first calculated value A".

Further, numbers from 1 to K are provided to K kinds of positional relations as to the evaluation value pair. Then, an inner product of (59×59) two-dimensional histogram characteristic amounts, obtained from the two-dimensional evaluation value histogram corresponding to a positional relation of a number p (1≤p≤K) as to the evaluation value pair, and a weight vector, made up of (59×59) weigh values respectively corresponding to the (59×59) two-dimensional histogram characteristic amounts, is taken as a "second calculated value Bp".

When a detection probability value v is expressed with use of the first calculated value A and the second calculated value Bp, the following formula (4) is given:

[Mathematical Formula 4]

$$v = A + B1 + B2 + \ldots + BK \quad (4)$$

It is to be noted that the first calculated value A concerning the image within the frame can be said to be a kind of detection probability value indicative of a probability that the image within the frame is a face image. Further, the second calculated value Bp concerning the image within the frame can be said to be a kind of detection probability value indicative of a probability that the image within the frame is a face image.

In the method for calculating a comparison object as thus described, a one-dimensional evaluation value histogram and a two-dimensional evaluation value histogram are generated, and a value at each bin in the generated one-dimensional evaluation value histogram and two-dimensional evaluation value histogram is multiplied by a weigh value, thereby making the detection probability value calculating processing rough and a processing speed low.

In the present preferred embodiment, there will be proposed a configuration of the probability value acquiring circuit 37 capable of improving the processing speed of the detection probability value calculating processing, while obtaining the same detection probability value as in the method for calculating a comparison object. Hereinafter, the probability value acquiring circuit 37 will be described in detail.

<Details of Probability Value Acquiring Circuit>

FIG. 35 is a diagram showing the configuration of the probability value acquiring circuit 37. The probability value acquiring circuit 37 is a kind of image processing circuit, and as shown in FIG. 35, it is provided with a control circuit 700, a first selection circuit 720, (K+1) processing circuits 730 and an addition circuit 740.

The control circuit 700 controls operations of the first selection circuit 720 and each of the processing circuits 730. Setting information for setting the operations of the first selection circuit 720 and each of the processing circuits 730 is inputted from the processor 36 into the control circuit 700. Hereinafter, the setting information for setting the operation of the first selection circuit 720 may be referred to as "first setting information". Further, the setting information for setting the operation of the processing circuit 730 may be referred to as "second setting information". The first setting information is control information for controlling the first selection circuit 720, and the second setting information is control information for controlling the processing circuit 730.

The control circuit 700 has a first register 701. The control circuit 700 stores the first setting information, inputted from the processor 36, into the first register 701. Further, the control circuit 700 has (K+1) second registers 702 respectively corresponding to the (K+1) processing circuits 730. Concerning each of the (K+1) processing circuits 730, the control circuit 700 stores the second setting information, which is inputted from the processor 36 and serves to set the operation of the processing circuit 730, into the second register 702 corresponding to the processing circuit 730.

The first selection circuit 720 selects one evaluation value from the evaluation value block that is inputted from the processor 36 into the probability value acquiring circuit 37, and outputs the selected value. The evaluation value selected by the first selection circuit 720 is decided based on the first setting information stored in the first register 701. In the present preferred embodiment, the first selection circuit 720 sequentially changes one evaluation value to be selected from the evaluation value block in accordance with the first setting information, to sequentially change the evaluation value to be outputted. Accordingly, a plurality of evaluation values constituting the evaluation value block are sequentially outputted one by one from the first selection circuit 720.

The addition circuit 740 adds later-mentioned output integrated values that are outputted from the (K+1) processing circuits 730, and outputs an addition value obtained thereby. This addition value becomes a detection probability value concerning the image within the frame.

Figures 36, 37:
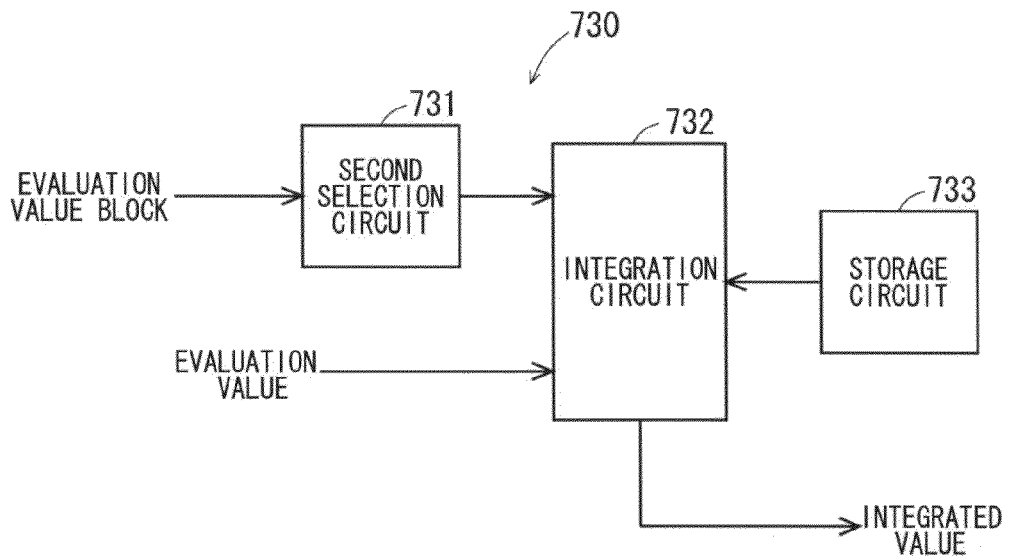
FIG. 36 is a diagram showing a configuration of a processing circuit.
FIG. 37 is a diagram showing weigh values stored in a storage circuit of a first processing circuit.

FIG. 36 is a diagram showing a configuration of each processing circuit 730. The (K+1) processing circuits 730 have the same circuit configuration and operate in parallel with each other. As shown in FIG. 36, the processing circuit 730 is provided with a second selection circuit 731, an integration circuit 732 and a storage circuit 733. The storage circuit 733 is, for example, a RAM.

The second selection circuit 731 has a selection mode of selecting one evaluation value from an evaluation value block in accordance with an evaluation value upon output of the evaluation value from the first selection circuit 720 and outputting the selected value, and a non-selection mode of not selecting an evaluation value from the evaluation value block. The mode of the second selection circuit 731 is decided based on the second setting information stored in the second register 702 corresponding thereto (the second register 702 corresponding to the processing circuit 730, to which the second selection circuit 731 belongs). An evaluation value is not outputted from the second selection circuit 731 on the non-selection mode.

The evaluation value selected by the second selection circuit 731 on the selection mode is decided based on the second setting information within the second register 702. In the present preferred embodiment, the second selection circuit 731 on the selection mode sequentially changes one evaluation value to be selected from the evaluation value block in accordance with the second setting information, to sequentially change the evaluation value to be outputted. The second selection circuit 731 on the selection mode operates in accordance with the second setting information, thereby to output an evaluation value different from the evaluation value outputted from the first selection circuit 720. The evaluation value selecting operation in the second selection circuit 731 is in synchronization with the evaluation value selecting operation in the first selection circuit 720.

The integration circuit 732 is connected with an output of the first selection circuit 720 and an output of the second selection circuit 731. Every time the second selection circuit 731 outputs an evaluation value, the integration circuit 732 reads a weigh value, stored in the storage circuit 733, from the storage circuit 733 and integrates the read values. The integration circuit 732 outputs the obtained integrated value to the addition circuit 740.

In the present preferred embodiment, one processing circuit 730 out of the (K+1) processing circuits 730 performs processing concerning an evaluation value single characteristic amount, and hereinafter, this processing circuit 730 may be referred to as a "first processing circuit 730". Then the remaining K processing circuits 730 respectively correspond to K kinds of positional relations (FIG. 28) as to the evaluation value pair. The processing circuit 730 corresponding to the positional relation of the number p as to the evaluation value pair performs processing concerning the evaluation value pair (co-occurrence characteristic amount) with the first and second evaluation values being in the positional relation of the number p. Hereinafter, each of the processing circuits 730 other than the first processing circuit 730 may be referred to as a "second processing circuit 730".

In the first processing circuit 730, the second selection circuit 731 operates on the non-selection mode. Therefore, only an evaluation value outputted from the first selection circuit 720 is inputted into the integration circuit 732 of the first processing circuit 730, and an evaluation value is not inputted thereinto from the second selection circuit 731.

On the other hand, in the second processing circuit 730, the second selection circuit 731 operates on the selection mode. Therefore, an evaluation value outputted from the first selection circuit 720 and an evaluation value outputted from the second selection circuit 731 are inputted into the integration circuit 732 of the second processing circuit 730.

Further in the present preferred embodiment, the first selection circuit 720 operates in accordance with the first setting information, thereby to sequentially select an evaluation value from the top left to the bottom right (along the raster-scanning direction) in the evaluation value block and outputs the selected values in the same manner as in the method for deciding the first evaluation value 500 in FIGS. 30 to 32. Therefore, a plurality of evaluation values constituting the evaluation value block are sequentially inputted one by one from the top left to the bottom right (along the raster-scanning direction), into the integration circuit 732. In the first processing circuit 730, the evaluation value outputted from the first selection circuit 720 becomes the evaluation value single characteristic amount. That is, it can be said that the first selection circuit 720 acquires the evaluation value single characteristic amount from the evaluation value block. On the other hand, in the second processing circuit 730, the evaluation value outputted from the first selection circuit 720 becomes the first evaluation value of the co-occurrence characteristic amount (evaluation value pair). That is, it can be said that the first selection circuit 720 acquires the first evaluation value of the co-occurrence characteristic amount (evaluation value pair) from the evaluation value block.

In the first processing circuit 730, every time the evaluation value single characteristic amount (evaluation value) is outputted from the first selection circuit 720, the integration circuit 732 reads a weigh value corresponding to the evaluation value single characteristic amount from the storage circuit 733, and integrates the read values. That is, every time the evaluation value single characteristic amount (evaluation value) is outputted from the first selection circuit 720, the integration circuit 732 reads a weigh value corresponding to the evaluation value single characteristic amount from the storage circuit 733, and adds the read value to an integrated value of weigh values so far. Then, when the evaluation value at the bottom right of the evaluation value block is outputted from the first selection circuit 720 and the weigh value corresponding to the evaluation value is added to the integrated value of the weigh values so far, the integration circuit 732 outputs an integrated value obtained thereby to the addition circuit 740. The integrated value that is outputted to the addition circuit 740 is referred to as an "output integrated value". The output integrated value that is outputted from the first processing circuit 730 is an integrated value of weigh values corresponding to all evaluation values of the evaluation value block.

FIG. 37 is a diagram showing weigh values stored in the storage circuit 733 of the first processing circuit 730. As shown in FIG. 37, the storage circuit 733 of the first processing circuit 730 stores evaluation value single characteristic amounts, namely weigh values, corresponding to each of plural kinds of values that the evaluation values can take, and generated based on a learning sample concerning a face image. In the present preferred embodiment, since the number of kinds of values that the evaluation value can take is 59, 59 weigh values $\alpha 0$ to $\alpha 58$ respectively corresponding to the 59 kinds of values are respectively associated with the 59 kinds of values in the storage circuit 733 of the first processing circuit 730.

As thus described, in the first processing circuit 730, weigh values which respectively correspond to a plurality of evaluation values (plurality of evaluation value single characteristic amounts) constituting an evaluation value block and sequentially outputted from the first selection circuit 720 are integrated, and the obtained integrated value is outputted as an output integrated value. Hereinafter, the output integrated value outputted from the first processing circuit 730 may be referred to as a "first output integrated value C".

The first output integrated value C coincides with the first calculated value A in the method for calculating a comparison object described above, namely the inner product of the characteristic vector made up of 59 one-dimensional histogram characteristic amounts obtained from the one-dimensional evaluation value histogram and the weight vector made up of 59 weigh values respectively corresponding to the 59 one-dimensional histogram characteristic amounts. The plurality of weigh values constituting the weight vector coincide with the plurality of weigh values stored in the storage circuit 733 of the first processing circuit 730.

In the second processing circuit 730 corresponding to the positional relation of the number p as to the evaluation value pair, the second selection circuit 731 selects from the evaluation value block an evaluation value (second evaluation value) which is in the positional relation of the number p with an evaluation value (first evaluation value) outputted from the first selection circuit 720 and makes a pair with this evaluation value, and outputs the selected value. At this time, in the case of non-existence of the evaluation value which is in the positional relation of the number p with the evaluation value outputted from the first selection circuit 720 and makes a pair with this evaluation value, the second selection circuit 731 does not output the evaluation value.

Every time the evaluation value (second evaluation value) is outputted from the second selection circuit 731, the integration circuit 732 reads a weigh value corresponding to a combination (co-occurrence characteristic amount) between the evaluation value and an evaluation value, which is outputted from the first selection circuit 720 and makes a pair with the above evaluation value, from the storage circuit 733 and integrates the read values. That is, in the second processing circuit 730 corresponding to the positional relation of the number p as to the evaluation value pair, every time the second evaluation value is outputted from the second selection circuit 731, the integration circuit 732 reads a weigh value corresponding to a combination of the second evaluation value and the first evaluation value, which makes a pair with the second evaluation and is outputted from the first selection circuit 720, from the storage circuit 733 and adds the read value to an integrated value of weigh values so far. It is to be noted that in the case of the evaluation value not being outputted from the second selection circuit 731, weigh values are not integrated in the integration circuit 732. Then, when the evaluation value at the bottom right of the evaluation value block is outputted from the first selection circuit 720 and the weigh value corresponding to a combination of the evaluation value and the evaluation value which is outputted from the second selection circuit 731 and makes a pair with the above evaluation is added to an integrated value of weigh values so far, the integration circuit 732 outputs an integrated value (output integrated value) obtained thereby to the addition circuit 740. The output integrated value that is outputted from the second processing circuit 730 corresponding to the positional relation of the number p as to the evaluation value pair becomes an integrated value of weigh values corresponding to all evaluation value pairs considered in the evaluation value block and each made up of the first evaluation value and the second evaluation value forming the positional relation of the number p.

Each of K second processing circuits 730 operates in the same manner as above, to output the found output integrated value to the addition circuit 740.

Figures 38, 39:
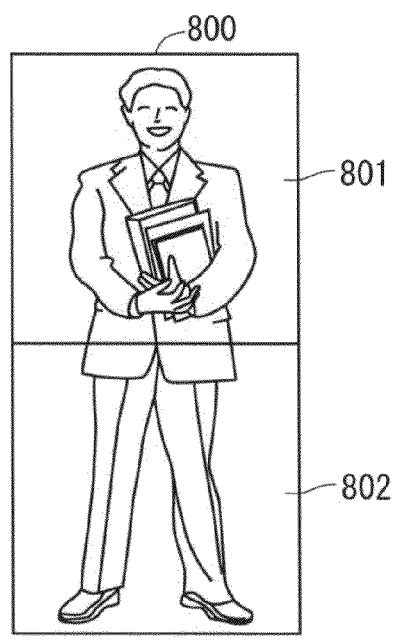
FIG. 38 is a diagram showing weigh values stored in a storage circuit of a second processing circuit.
FIG. 39 is a view showing a human body detection result region made up of an upper half body detection result region and a lower half body detection result region.

FIG. 38 is a diagram showing weigh values stored in the storage circuit 733 of the second processing circuit 730 corresponding to the positional relation of the number p as to the evaluation value pair. As shown in FIG. 38, the storage circuit 733 stores a plurality of weigh values, respectively corresponding to plural kinds ((59×59) kinds) of value combinations of the first evaluation value and the second evaluation value, which the evaluation value pair made up of the first and second evaluation values forming the positional relation of the number p (co-occurrence characteristic amount corresponding to the positional relation of the number p) can take, and generated based on a learning sample concerning a face image. In FIG. 38, a combination (i, j) of a first evaluation value i ($0 \le i \le 58$) and a second evaluation value j ($0 \le j \le 58$) is represented. Further, a weigh value corresponding to (i, j) is represented by $\beta i$–$j$. In the present preferred embodiment, since the number of kinds of values that the evaluation value can take is 59, (59×59) weigh values $\beta 0$–$0$ to $\beta 58$–$58$ of the first evaluation value and the second evaluation value are respectively associated with the (59×59) kinds of value combinations in the storage circuit 733 of the second processing circuit 730.

As thus described, in the second processing circuit 730 corresponding to the positional relation of the number p, an integrated value of weigh values corresponding to evaluation value pairs, considered in the evaluation value block and each made up of the first evaluation value and the second evaluation value forming the positional relation of the number p, is calculated and outputted. Hereinafter, the output integrated value outputted from the second processing circuit 730 corresponding to the positional relation of the number p may be referred to as a "second output integrated value Dp".

The second output integrated value Dp coincides with the second calculated value Bp in the method for calculating a comparison object described above, namely the inner product of the characteristic vector made up of (59×59) two-dimensional histogram characteristic amounts, obtained from the two-dimensional evaluation value histogram corresponding to the positional relation of the number p, and a weight vector made up of (59×59) weigh values respectively corresponding to the (59×59) two-dimensional histogram characteristic amounts. The plurality of weigh values constituting the weight vector coincide with a plurality of weigh values stored in the storage circuit 733 of the second processing circuit 730 corresponding to the positional relation of the number p.

The addition circuit 740 adds the first output integrated value C outputted from the first processing circuit 730 and K second output integrated values D1 to DK respectively outputted from the K second processing circuits 730. The addition value obtained in the addition circuit 740 becomes the detection probability value v. The detection probability value v can be expressed by the following formula (5):

[Mathematical Formula 5]

$$v = C + D1 + D2 + \ldots + DK \quad (5)$$

Since the first output integrated value C coincides with the first calculated value A and the second output integrated value Dp coincides with the second calculated value Bp as thus described, the detection probability value v expressed by the formula (4) is the same as the detection probability value v expressed by the formula (5). That is, the detection probability value v found in the method for calculating a comparison object is the same as the detection probability value v found in the probability value acquiring circuit 37 according to the present preferred embodiment.

The first output integrated value C concerning the image within the frame can be said to be a kind of detection probability value indicative of a probability that the image within the frame is a face image. Further, the second output integrated value Dp concerning the image within the frame can be said to be a kind of detection probability value indicative of a probability that the image within the frame is a face image.

It is to be noted that changing the second setting information for setting the operation of the processing circuit 730 can halt the operation of the processing circuit 730. When the processing circuit 730 is halted, the second selection circuit 731 does not perform the selection operation and the integration circuit 732 does not perform the integration processing. Hence an integrated value is not outputted from the halted processing circuit 730.

As above, in the probability value acquiring circuit 37 according to the present preferred embodiment, the second selection circuit 731 and the integration circuit 732 can be operated in parallel among a plurality of processing circuits 730, thereby allowing improvement in processing speed of the processing for obtaining a detection probability value. Further, the processor is not used for the probability value acquiring circuit 37 and a program is not required for the operation of the probability value acquiring circuit 37 itself, thereby allowing further improvement in processing speed of the processing for obtaining a detection probability value.

Moreover, in the present preferred embodiment, the control circuit 700 is provided with the second register 702 that stores second setting information for setting an evaluation value selecting operation in the second selection circuit 731. Rewriting the second setting information within the second register 702 by the processor 36 or the like can change an evaluation value selected in the second selection circuit 731. Hence it is possible to change the relative positional relation that the second evaluation value selected in the second selection circuit 731 has with the first evaluation value selected in the first selection circuit 720. Accordingly, changing the second setting information within the second register 702 allows appropriate setting of K kinds of positional relations as to the evaluation value pair in accordance with a detection object image, an imaging environment of the imaging device 2 or the like.

In the present preferred embodiment, changing the second setting information for setting the operation of the processing circuit 730 can halt the operation of the processing circuit 730, so as to prevent an integrated value from being outputted from the processing circuit 730. Therefore, the number of kinds of positional relations between the first and second evaluation values as to the evaluation value map can be reduced from K which is the same number as that of the second processing circuits 730. That is, the number of kinds of positional relations as to the evaluation value pair can be set to K at the maximum. Accordingly, it is possible to appropriately set the kind of positional relation between the first and second evaluation values as to the evaluation value pair in accordance with a detection object image, an imaging environment of the imaging device 2 or the like.

Further, the second setting information may be inputted from the outside into the image detection device 3, and the inputted second setting information may be stored into the second register 702 within the control circuit 700. Accordingly, inputting the second setting information into the image detection device 3 allows rewriting of the second setting information within the second register 702 of the control circuit 700.

It is to be noted that the first setting information within the first register 701 may be rewritten by the processor 36 or the like.

Further, in the present preferred embodiment, since a pair of two evaluation values being in a predetermined relative positional relation is taken as a characteristic amount (co-occurrence characteristic amount), an appropriate characteristic amount for image detection such as detection of a face image can be obtained. Therefore, obtaining a detection probability value based on the characteristic amount obtained from the image allows accurate determination as to whether the image has a high probability of being a detection object image. As a result, it is possible to suppress erroneous detection for the detection object image. That is, the detection accuracy for the detection object image improves.

In addition, although the detection probability value has been found based on both the evaluation value single characteristic amount and the co-occurrence characteristic amount in the above example, the detection probability value may be found based only on the co-occurrence characteristic amount out of those. That is, the first processing circuit 730 may be halted, and only output integrated values outputted from a plurality of second processing circuits 730 may be added in the addition circuit 740.

Further, as for the evaluation value expressing characteristics of pixels, one other than the LBP, the negative LTP and the positive LTP may be used. For example, a luminance gradient of pixels may be taken as the evaluation value.

Moreover in the addition circuit 740, output integrated values outputted from a plurality of processing circuits 730 and a detection probability value found based on characteristic amounts such as an HOG characteristic amount or an Haar-like characteristic amount and a weigh value (weighted coefficient) may be added, and the addition value may be inputted into the processor 36 as a detection probability value to be used in the probability value determination processing.

Further, although the processor 36 has performed the detection processing on an entire region of the processing object image in the above example, it may perform the detection processing only on a region other than a region having a low probability of being a face image. For example, a smooth and flat region may be specified in the processing object image in the evaluation value map generating circuit 34 or the like with use of Hadamard transform or the like, and the detection processing may be performed only on a region other than the smooth and flat region in the processing object image. Further, a skin-colored region may be specified in the processing object image in the evaluation value map generating circuit 34 or the like, and the detection processing may be performed only on the region.

<A Variety of Modified Examples>

Hereinafter, a variety of modified examples of the present preferred embodiment will be described.

<First Modified Example>

Although the image detection section 14 has detected one kind of detection object image from the processing object image in the above example, it may be made capable of detecting plural kinds of detection object images (e.g., a face image, a human body image, a vehicle image, etc.).

For example, a weigh value (learning data) stored in the storage circuit 733 of each processing circuit 730 in the probability value acquiring circuit 37 is made rewritable by the processor 36 or the like, thereby allowing the image detection device 3 to detect plural kinds of detection object images from the processing object image. That is, the processor 36 or the like rewrites a weigh value within each storage circuit 733 in accordance with the kind of the detection object images, thereby allowing the image detection device 3 to detect plural kinds of detection object images from the processing object image with use of the same hardware configuration.

In the case of rewriting a weigh value within the storage circuit 733 in accordance with the kind of detection object images, for example, plural kinds of weigh values (plural kinds of learning data) respectively corresponding to plural kinds of detection object images are previously stored into the storage section 12. For example, plural kinds of weigh values respectively corresponding to an image of a human face turning to the front, an image of a human face turning to the right and an image of a human face turning to the left are previously stored into the storage section 12. Then, the processor 36 reads the weigh value corresponding to a certain kind of detection object image (e.g., the image of the human face turning to the front) from the storage section 12 and stores it into each storage circuit 733. It is thereby possible to obtain in the probability value acquiring circuit 37 a detection probability value indicative of a probability that an image within the frame is the certain kind of detection object image. In the image detection device 3, the certain kind of detection object image is specified in the processing object image based on the detection probability value.

Further, the processor 36 reads the weigh value corresponding to another kind of detection object image (e.g., the image of the human face turning to the left) from the storage section 12 and stores it into each storage circuit 733. It is thereby possible to obtain in the probability value acquiring circuit 37 a detection probability value indicative of a probability that the image within the frame is another kind of detection object image. In the image detection device 3, another kind of detection object image is specified in the processing object image based on the detection probability value.

Moreover, a weigh value may be inputted from the outside into the image detection device 3, and the inputted second setting information may be stored into the storage section 12. This allows a weigh value inputted by a user into the image detection device 3 to be stored into each storage circuit 733.

As thus described, a weigh value which is stored in each storage circuit 733 is made rewritable, thereby allowing the probability value acquiring circuit 37 to obtain detection probability values concerning plural kinds of detection object images. Hence the image detection section 14 can detect plural kinds of detection object images from the processing object image.

Further, plural kinds of weigh values (plural kinds of learning data) respectively corresponding to plural kinds of detection object images are stored into each storage circuit 733, thereby allowing the probability value acquiring circuit 37 to obtain detection probability values concerning the plural kinds of detection object images. Hence the image detection section 14 becomes able to detect plural kinds of detection object images from the processing object image. Each of the plural kinds of weigh values stored in the storage circuit 733 of the second processing circuit 730 corresponding to the positional relation of the number p as to the evaluation value pair is one in accordance with a combination of the second evaluation value outputted from the second selection circuit 731 and the first evaluation value which forms the positional relation of the number p with the second evaluation value and is outputted from the first selection circuit 720, and is one generated based on a learning sample concerning the corresponding detection object image.

As thus described, in the case of storing plural kinds of weigh values respectively corresponding to plural kinds of detection object images into each storage circuit 733, the control circuit 700 sets the kind of weigh value to be used with respect to the integration circuit 732 of each processing circuit 730 based on the second setting information within the second register 702. Thereby in each processing circuit 730, the integration circuit 732 reads from the storage circuit 733 the kind of weigh value set by the control circuit 700, generates an output integrated value with use of the weigh value, and outputs the output integrated value. Therefore, in the probability value acquiring circuit 37, there are obtained a detection probability value concerning the detection object image corresponding to the kind of weigh value set by the control circuit 700. Then, in the image detection section 14, based on the detection probability value, the detection object image corresponding to the kind of weigh value set by the control circuit 700 is specified in the processing object image.

As thus described, plural kinds of weigh values respectively corresponding to plural kinds of detection object images (specific images) are stored into each storage circuit 733 and the kind of weigh value to be used in each integration circuit 732 is changed, thereby allowing detection probability values concerning the plural kinds of detection object images to be found with use of the same hardware configuration. Hence it becomes possible to detect plural kinds of detection object images from the processing object image with use of the same hardware configuration.

In the case of storing plural kinds of weigh values respectively corresponding to plural kinds of detection object images into the storage section 12, in order to change the kind of detection object image, it is necessary to read from the storage section 12 a weigh value corresponding to a detection object image after changed and then store the weigh value into the storage circuit 733.

As opposed to this, in the case of storing plural kinds of weigh values respectively corresponding to plural kinds of detection object images into each storage circuit 733, the kind of detection object image can be changed just by changing the kind of weigh value read by the integration circuit 732 from the storage circuit 733. Therefore, the processing speed improves more than in the case of storing the plural kinds of weigh values into the storage section 12.

Further, as in the present example, in the case of the probability value acquiring circuit 37 being able to obtain detection probability values concerning plural kinds of detection object images, an entire image may be specified with each of the plural kinds of detection object images taken as a part thereof based on the detection probability values concerning the plural kinds of specific images. This processing is synonymous with processing of dividing a detection object image into a plurality of partial images, individually performing the detection processing on each of the plurality of partial images, and calculating a detection probability values concerning the plurality of partial images, to specify a detection object image based on the calculated detection probability values.

For example, based on detection probability values concerning a human upper half body image and a human lower half body image, there may be specified a human body image with the upper half body image and the lower half body image taken as an upper-side portion and a lower-side portion thereof.

Further, for example, based on detection probability values concerning an image of a front portion of a vehicle and an image of a rear portion thereof as seen from the side, there may be specified an entire vehicle image with the front-portion image and the rear-portion image taken as a front portion and a rear portion thereof.

In the case of specifying an image of a human body with each of an upper half body image and a lower half body image taken as a part thereof based on detection probability values concerning the upper half body image and the lower half body image, for example, a weigh value corresponding to the upper half body image and a weigh value corresponding to the lower half body image are stored into each storage circuit 733. Then, in the same manner as above, the image detection section 14 first performs the detection processing with the upper half body image taken as a detection object image with use of a weigh value corresponding to the upper half body image within each storage circuit 733, and acquires in the processing object image a detection result region (hereinafter referred to as "upper-half-body detection result region") with a high probability of being the upper half body image and a detection probability value (hereinafter referred to as "upper-half-body detection probability value") indicative of a probability that the detection result region is the upper half body image.

Next, the image detection section 14 performs the detection processing with the lower half body image taken as a detection object image only on a lower portion of each upper half body detection result region in the processing object image with use of a weigh value corresponding to the lower half body image within each storage circuit 733, and acquires a detection result region (hereinafter referred to as "lower-half-body detection result region") with a high probability of being the lower half body image and a detection probability value (hereinafter referred to as "lower-half-body detection probability value") indicative of a probability that the detection result region is the lower half body image.

Subsequently in the image detection section 14, the processor 36 specifies a pair of the upper half body detection result region and the lower half body detection result region which are located mutually above and below in the acquired upper half body detection result region and the lower half body detection result region. Then, concerning each pair of the upper half body detection result region and the lower half body detection result region which are located mutually above and below, the processor 36 adds the upper-half-body detection probability value and the lower-half-body detection probability value of the upper half body detection result region and the lower half body detection result region which form the pair, and determines whether the addition value is not smaller than a threshold. When the addition value of the upper-half-body detection probability value and the lower-half-body detection probability value of the upper half body detection result region and the lower half body detection result region which form the pair is not smaller than the threshold, the processor 36 determines that the upper half body detection result region and the lower half body detection result region respectively correspond to an upper half body image and a lower half body image of the same human body, to take each of the upper half body detection result region and the lower half body detection result region as a human body detection result region with a high probability of being the human body image. FIG. 39 is a view showing an example of a human body detection result region 800 made up of an upper half body detection result region 801 and a lower half body detection result region 802 which make a pair.

When a plurality of human body detection result regions are obtained, as described above, the processor 36 for example integrates a plurality of human body detection result regions close to one another by means of clustering by Mean-Shift method as well as Nearest Neighbor method, to specify an image within the human body detection result region after integrated in the processing object image as a human body image. Hence in the image detection section 14, the human body image in the processing object image is specified based on the detection probability value concerning the upper half body image and the detection probability value concerning the lower half body image.

It is to be noted that even in the case of storing into the storage section 12 plural kinds of weigh values respectively corresponding to plural kinds of detection object images, in such a manner as described above, detection probability values concerning the plural kinds of detection object images are calculated based on the plural kinds of weigh values within the storage section 12, thereby to allow specification of an entire image with each of the plural kinds of detection object images taken as a part thereof based on the calculated detection probability values.

Further, in the case of detecting a vertically long detection object image such as a human body image or a horizontally long detection object image directly from the processing object image with use of a regular square detection frame as in the above example, a percentage of a background portion (portion not being the detection object image) is large in the image within the frame. This can result in deterioration in detection accuracy.

In the case of detecting a vertically long or horizontally long detection object image with use of a regular square detection frame, it is desirable to divide the vertically long or horizontally long detection object image (human body image) into a plurality of partial images (an upper half body image and a lower half body image) and individually perform the detection processing on each of the plurality of partial images with use of the detection frame, as in the present modified example. Then, a detection object image (human body image) is specified based on detection results (a detection probability value concerning the upper half body image and a detection probability value concerning the lower half body image) obtained by the detection processing. It is thereby possible to accurately detect a vertically long or horizontally long detection object image from the processing object image with use of a regular square detection frame.

<Second Modified Example>

The image detection section 14 according to the present modified example obtains, with use of the same weigh value, detection probability values concerning two kinds of images (hereinafter referred to as "horizontally inverted image pair") like those with one image being largely inverted horizontally symmetrically to the other image, such as an image of the human face turning to the left (hereinafter referred to as "left-turned-face image") and an image of the human face turning to the right (hereinafter referred to as "right-turned-face image"). That is, the image detection section 14 according to the present modified example can detect each image of the horizontally inverted image pair from the processing object image with use of the same weigh value. Hereinafter, the operation of the image detection section 14 according to the present modified example will be described. Hereinafter, one image of the horizontally inverted image pair as a detection object is referred to as a "first detection object image", and the other image of the horizontally inverted image pair is referred to as a "second detection object image". Then, a detection probability value concerning the first detection object image is referred to as a "first detection probability value", and a detection probability value concerning the second detection object image is referred to as a "second detection probability value.

In the present modified example, in the probability value acquiring circuit 37, only the second processing circuit 730 operates while the first processing circuit 730 does not operate. That is, in the probability value acquiring circuit 37 according to the present modified example, only an output integrated values from a plurality of processing circuits 730 are added in the addition circuit 740.

Further, in the probability value acquiring circuit 37, the second selection circuit 731 of each processing circuit 730 has, as selection modes, a first selection mode which becomes effective at the time of obtaining the first detection probability value concerning the first detection object image of the horizontally inverted image pair as the detection object and a second selection mode which becomes effective at the time of obtaining the second detection probability value concerning the second detection object image of the horizontally inverted image pair. The selection mode of each second processing circuit 730 is set by the control circuit 700. Specifically, the selection mode of each second processing circuit 730 is decided based on second setting information within the second register 702 of the control circuit 700 which corresponds to the second processing circuit 730. The first detection object image is for example a left-turned-face image, and the second detection object image is for example a right-turned-face image. Moreover in the present modified example, a weigh value corresponding to the first detection object image (left-turned-face image) is for example stored in each of the storage circuits 733 of the plurality of second processing circuits 730.

In the present modified example, in the second processing circuit 730 corresponding to the positional relation of the number p as to the evaluation value pair, when the first evaluation value is outputted from the first selection circuit 720, the second selection circuit 731 that operates on the first selection mode selects the second evaluation value, which makes a pair with the first evaluation value that makes the positional relation of the number p with the second evaluation value, from the evaluation value block and outputs the selected value, in the same manner as in the above example.

On the other hand, in the second processing circuit 730 corresponding to the positional relation of the number p as to the evaluation value pair, when the first evaluation value is outputted from the first selection circuit 720, the second selection circuit 731 that operates on the second selection mode selects, as a pair of the first evaluation value, the second evaluation value which forms a positional relation horizontally symmetrical to the positional relation of the number p with the first evaluation value, from the evaluation value block and outputs the selected value, in a different manner from the above example. For example, as for the first and second evaluation values which form the positional relation of the number p, when the second evaluation value exists adjacent to the first evaluation value on the right side of the first evaluation value, the second selection circuit 731 that operates on the second selection mode selects as the second evaluation value an evaluation value adjacent to the first evaluation value on the left side of the first evaluation value outputted from the first selection circuit 720, and outputs the selected value. Further, for example, as for the first and second evaluation values which form the positional relation of the number p, when the second evaluation value exists adjacent to the first evaluation value right-down diagonal to the first evaluation value, the second selection circuit 731 that operates on the second selection mode selects as the second evaluation value an evaluation value adjacent to the first evaluation value right-down diagonal to the first evaluation value outputted from the first selection circuit 720, and outputs the selected value.

Figure 40:
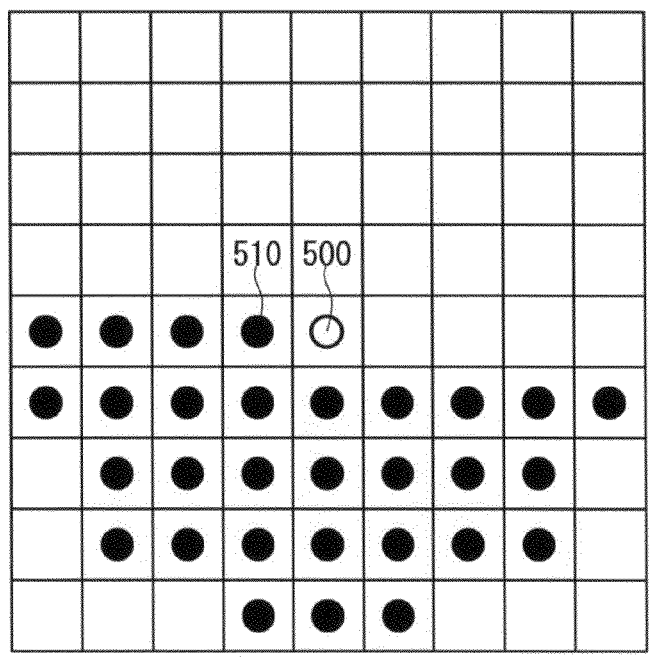
FIGS. 40 and 41 are diagrams each showing plural kinds of positional relations as to evaluation value pairs at the time of a second selection mode.

As thus described, in the second selection circuit 731 of each second processing circuit 730 in the present modified example, both the positions of the second evaluation value making a pair with the first evaluation value outputted from the first selection circuit 720 in the first and the second selection modes are horizontally symmetrical to the position of the first evaluation value. Therefore, assuming that K kinds of positional relations as to the evaluation value pair in the case of each second selection circuit 731 being on the first selection mode are the positional relations shown in FIG. 29 described above, K kinds of positional relations as to the evaluation value pair in the case of each second selection circuit 731 being on the second selection mode are positional relations as in FIG. 40. Weighted values corresponding to the first detection object image which are stored in the storage circuits 733 of K second processing circuits 730 are weigh values generated based on a co-occurrence characteristic amount (evaluation value pair) corresponding to K kinds of positional relations shown in FIG. 29 which are acquired from the learning sample concerning the first detection object image.

In each second processing circuit 730, even in the case of the second selection circuit 731 operating on the first selection mode or operating on the second selection mode, the integration circuit 732 reads from the storage circuit 733 a weigh value in accordance with a combination of the first evaluation value outputted from the first selection circuit 720 and the second evaluation value which is outputted from the second selection circuit 731 and makes a pair with the first evaluation value, and adds the read value to an integrated value of weigh values so far. For example, even in the case of the second selection circuit 731 operating on the first selection mode or operating on the second selection mode, when the first evaluation value outputted from the first selection circuit 720 is "0" and the second evaluation value which is outputted from the second selection circuit 731 and makes a pair with the first evaluation value is "1", the integration circuit 732 reads a weigh value β0-1 (cf. FIG. 38) from the storage circuit 733, and adds the read value to an integrated value of weigh values so far.

When the second selection circuit 731 of each second processing circuit 730 is on the first selection mode, the addition circuit 740 adds an output integrated value outputted from the integration circuit 732 of each second processing circuit 730, and outputs the addition value as the first detection probability value concerning the first detection object image to the processor 36. Further, when the second selection circuit 731 of each second processing circuit 730 is on the second selection mode, the addition circuit 740 adds an output integrated value outputted from the integration circuit 732 of each second processing circuit 730, and outputs the addition value as the second detection probability value concerning the second detection object image to the processor 36.

As thus described, both the positions of the second evaluation value making a pair with the same first evaluation value in the first and the second selection modes are made horizontally symmetrical to the position of the first evaluation value, whereby it is possible to obtain a detection probability value concerning each image of the horizontally inverted image pair with use of the same weigh value.

It is to be noted that the first detection object image may be a right-turned-face image and the second detection object image may be a left-turned-face image.

Figure 41:
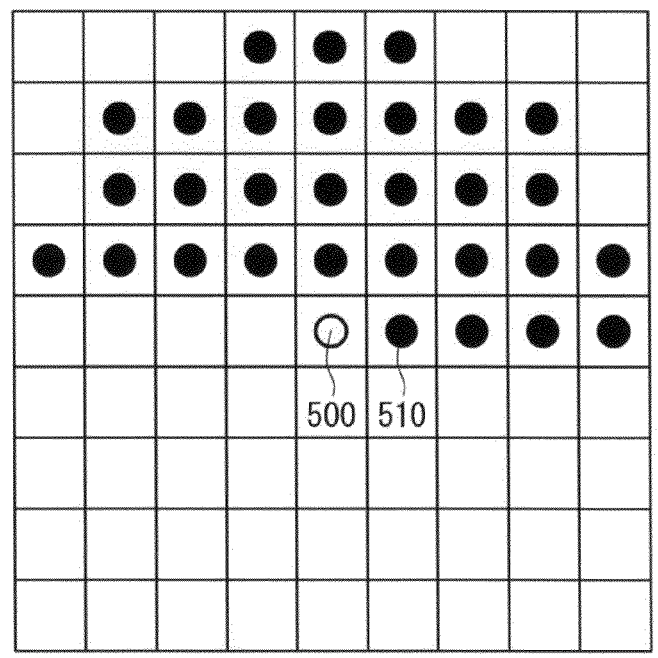

Further, detection probability values concerning two kinds of images (hereinafter referred to as "vertically inverted image pair") like those with one image being largely inverted vertically symmetrically to the other image can also be obtained with use of the same weigh value in the same manner as above. That is, it is possible to detect each image of the vertically inverted image pair with use of the same weigh value. In this case, in the second selection circuit 731 of each second processing circuit 730, both the positions of the second evaluation value making a pair with the first evaluation value outputted from the first selection circuit 720 in the first and the second selection modes are vertically symmetrical to the position of the first evaluation value. Therefore, in this case, assuming that K kinds of positional relations as to the evaluation value pair in the case of each second selection circuit 731 being on the first selection mode are the positional relations shown in FIG. 29 described above, K kinds of positional relations as to the evaluation value pair in the case of each second selection circuit 731 being on the second selection mode are positional relations as in FIG. 41.

As thus described, even in the case of obtaining detection probability values concerning a horizontally inverted image pair with use of the same weigh value, an entire image may be specified with each image of the horizontally inverted image pair taken as a part thereof based on the detection probability values concerning the horizontally inverted image pair in the same manner as in the above first modified example. In a vehicle image seen from the side, since an image of a front portion of a vehicle is an image largely inverted horizontally symmetrically to an image of a rear portion thereof, when the first detection object image is one image of those of the front portion and the rear portion of the vehicle seen from the side and the second detection object image is the other image of those of the front portion and the rear portion, based on detection probability values concerning the image of the front portion of the vehicle and the image of the rear portion thereof, it is possible to specify an image of the entire vehicle with the image of the front portion of the vehicle and the image of the rear portion thereof each taken as a part thereof.

Further, when the first detection object image is an image of a left half of a human face and the second detection object image is an image of a right half of the human face, based on detection probability values concerning the image of the left half of the human face and the image of the right half of the human face, it is possible to specify an image of the entire human face with the left-half image and the right-half image each taken as a part thereof.

Moreover, even in the case of obtaining detection probability values concerning a vertically inverted image pair with use of the same weigh value, an entire image may be specified with each image of the vertically inverted image pair taken as a part thereof based on the detection probability values concerning the vertically inverted image pair.

Although the image processing system 1 has been described in detail above, the above description is an exemplification in all aspects, and the present invention is not restricted thereto. Further, the foregoing variety of examples are applicable in combination so long as not being incompatible with one another. It is understood that a countless number of modified examples not being exemplified can be assumed without deviating the scope of the present invention.

While the invention has been shown and described in detail, the foregoing description is in all aspects illustrative and not restrictive. It is therefore understood that numerous modifications and variations can be devised without departing from the scope of the invention.

What is claimed is:

1. An image processing circuit for obtaining a probability value indicative of a probability that an input image is a specific image, said circuit comprising:

a first selection circuit for selecting one evaluation value out of a plurality of evaluation values which indicate respective characteristics of a plurality of pixels included in said input image and are allocated with positions different from one another, and outputting the selected value;

a plurality of second selection circuits, each for selecting one evaluation value from said plurality of evaluation values and outputting the selected value;

a plurality of storage circuits provided respectively corresponding to said plurality of second selection circuits;

a plurality of integration circuits provided respectively corresponding to said plurality of second selection circuits;

an addition circuit; and a control circuit for controlling selection of the evaluation values in said first selection circuit and said plurality of second selection circuits, wherein said first selection circuit sequentially changes one evaluation value selected out of said plurality of evaluation values, to change an evaluation value to be outputted, each of said plurality of second selection circuits selects, out of said plurality of evaluation values, one evaluation value being in a predetermined relative positional relation with a first evaluation value as an evaluation value which is outputted from said first selection circuit, and outputs the selected value, said predetermined relative positional relations are different from one another among said plurality of second selection circuits, each of said plurality of storage circuits stores a weigh value based on a learning sample concerning said specific image in accordance with a combination of a second evaluation value as an evaluation value which is outputted from the corresponding second selection circuit and said first evaluation value which makes a pair with the second evaluation value and is outputted from said first selection circuit, every time said second evaluation value is outputted from the second selection circuit corresponding to the integration circuit, the integration circuit reads, from the storage circuit corresponding to the second selection circuit, said weigh value in accordance with a combination of the second evaluation value and said first evaluation value which makes a pair with the second evaluation value and is outputted from said first selection circuit, to integrate the read values and outputs the consequently obtained integrated value, and said addition circuit at least adds a plurality of integrated values outputted from said plurality of integration circuits, so that an addition value is obtained and becomes said probability value.

2. The image processing circuit according to claim 1, wherein said weigh values stored in said plurality of storage circuits are rewritable.

3. The image processing circuit according to claim 1, wherein said image processing circuit is capable of obtaining said probability value concerning each of plural kinds of specific images, the probability value being indicative of a probability that said input image is the specific image, each of said plurality of storage circuits stores plural kinds of weigh values which respectively correspond to said plural kinds of specific images, each of said plural kinds of weigh values being based on a learning sample concerning the corresponding specific image in accordance with a combination of said second evaluation value outputted from the second selection circuit corresponding to the storage circuit and said first evaluation value which makes a pair with the second evaluation value and is outputted from said first selection circuit, said control circuit sets the kind of weigh value to be used with respect to said plurality of integration circuits, and every time said second evaluation value is outputted from the second selection circuit corresponding to the integration circuit, the integration circuit reads, from the storage circuit corresponding to the second selection circuit, the weigh value of the kind set by the control circuit in accordance with a combination of the second evaluation value and said first evaluation value which makes a pair with the second evaluation value and is outputted from said first selection circuit, to integrate the read values.

4. The image processing circuit according to claim 2, wherein said control circuit further includes a register which stores setting information for setting an operation to select the evaluation value in each of said plurality of second selection circuits.

5. The image processing circuit according to claim 1, wherein said image processing circuit is capable of obtaining a second probability value indicative of a probability that said input image is a second specific image of which a kind is different from that of a first specific image as said specific image, said plurality of second selection circuits have, as operation modes, a first mode which becomes effective at the time of obtaining a first probability value as said probability value concerning said first specific image, and a second mode which becomes effective at the time of obtaining said second probability value, said control circuit sets the operation mode of said plurality of second selection circuits, a position of said second evaluation value in said first mode and a position of said second evaluation value in said second mode, both making a pair with said same first evaluation value, are horizontally symmetrical or vertically symmetrical each other with respect to a position of the first evaluation value in each of said plurality of second selection circuits, in a case where the second selection circuit corresponding to the integration circuit is on said first mode, every time said second evaluation value is outputted from the second selection circuit, the integration circuit reads from the storage circuit corresponding to the second selection circuit said weigh value in accordance with a combination of the second evaluation value and said first evaluation value which makes a pair with the second evaluation value and is outputted from said first selection circuit, to integrate the read values and outputs the consequently obtained integrated value as a first integrated value, while in a case where the second selection circuit corresponding to the integration circuit is on said second mode, every time said second evaluation value is outputted from the second selection circuit, the integration circuit reads from the storage circuit corresponding to the second selection circuit said weigh value in accordance with a combination of the second evaluation value and said first evaluation value which makes a pair with the second evaluation value and is outputted from said first selection circuit, to integrate the read values and outputs the consequently obtained integrated value as a second integrated value, said addition circuit at least adds a plurality of integrated values outputted from said plurality of integration circuits in a case where said plurality of second selection circuits are on said first mode, so that a first addition value is obtained and becomes said first probability value, and said addition circuit at least adds a plurality of integrated values outputted from said plurality of integration circuits in a case where said plurality of second selection circuits are on said second mode, so that a second addition value is obtained and becomes said second probability value.

6. An image detection device, comprising: an image processing circuit for taking, as an input image, each of a plurality of images selected from a processing object image and obtaining a probability value indicative of a probability that the input image is a specific image; and a specification section for specifying said specific image in said processing object image based on said probability value found in said image processing circuit, wherein said image processing circuit has:

a first selection circuit for selecting one evaluation value out of a plurality of evaluation values which indicate respective characteristics of a plurality of pixels included in said input image and are allocated with positions different from one another, and outputting the selected value;
a plurality of second selection circuits, each for selecting one evaluation value from said plurality of evaluation values and outputting the selected value;
a plurality of storage circuits provided respectively corresponding to said plurality of second selection circuits;
a plurality of integration circuits provided respectively corresponding to said plurality of second selection circuits;
an addition circuit; and
a control circuit for controlling selection of the evaluation values in said first selection circuit and said plurality of second selection circuits,
said first selection circuit sequentially changes one evaluation value selected out of said plurality of evaluation values, to change an evaluation value to be outputted,
each of said plurality of second selection circuits selects, out of said plurality of evaluation values, one evaluation value being in a predetermined relative positional relation with a first evaluation value as an evaluation value which is outputted from said first selection circuit, and outputs the selected value,
said predetermined relative positional relations are different from one another among said plurality of second selection circuits,
each of said plurality of storage circuits stores a weigh value based on a learning sample concerning said specific image in accordance with a combination of a second evaluation value as an evaluation value which is outputted from the corresponding second selection circuit and said first evaluation value which makes a pair with the second evaluation value and is outputted from said first selection circuit,
every time said second evaluation value is outputted from the second selection circuit corresponding to each of said plurality of integration circuits, the integration circuit reads, from the storage circuit corresponding to the second selection circuit, said weigh value in accordance with a combination of the second evaluation value and said first evaluation value which makes a pair with the second evaluation value and is outputted from said first selection circuit, to integrate the read values and outputs the consequently obtained integrated value, and
said addition circuit at least adds a plurality of integrated values outputted from said plurality of integration circuits, so that an addition value is obtained and becomes said probability value.

7. The image detection device according to claim 6, wherein
said image processing circuit obtains said probability value concerning each of plural kinds of specific images, the probability value being indicative of a probability that said input image is the specific image,
each of said plurality of storage circuits stores a plural kinds of weigh values which respectively correspond to said plural kinds of specific images, each of said plural kinds of weigh value being based on a learning sample concerning the corresponding specific image in accordance with a combination of said second evaluation value outputted from the second selection circuit corresponding to the storage circuit and said first evaluation value which makes a pair with the second evaluation value and is outputted from said first selection circuit,
said control circuit sets the kind of weigh value to be used with respect to said plurality of integration circuits,
every time said second evaluation value is outputted from the second selection circuit corresponding to the integration circuit, the integration circuit reads, from the storage circuit corresponding to the second selection circuit, the weigh value of the kind set by the control circuit in accordance with a combination of the second evaluation value and said first evaluation value which makes a pair with the second evaluation value and is outputted from said first selection circuit, to integrate the read values, and
said specification section specifies a predetermined entire image with each of said plural kinds of specific images taken as a part thereof in said processing object image based on said probability values concerning said plural kinds of specific images obtained in said image processing circuit.

8. The image detection device according to claim 7, wherein
said plural kinds of specific images are images of a plurality of parts constituting a human body, and
said predetermined entire image is an image of a human whole body.

9. The image detection device according to claim 6, wherein
said image processing circuit obtains a second probability value indicative of a probability that said input image is a second specific image of which a kind is different from that of a first specific image as said specific image,
said plurality of second selection circuits have, as operation modes, a first mode which becomes effective at the time of obtaining a first probability value as said probability value concerning said first specific image, and a second mode which becomes effective at the time of obtaining said second probability value,
said control circuit sets the operation mode of said plurality of second selection circuits,
a position of said second evaluation value in said first mode and a position of said second evaluation value, both making a pair with said same first evaluation value, are horizontally symmetrical or vertically symmetrical each other with respect to a position of the first evaluation value in each of said plurality of second selection circuits,
in a case where the second selection circuit corresponding to the integration circuit is on said first mode, every time said second evaluation value is outputted from the second selection circuit, the integration circuit reads from the storage circuit corresponding to the second selection circuit said weigh value in accordance with a combination of the second evaluation value and said first evaluation value which makes a pair with the second evaluation value and is outputted from said first selection circuit, to integrate the read values and outputs the consequently obtained integrated value,
while in a case where the second selection circuit corresponding to the integration circuit is on said second mode, every time said second evaluation value is outputted from the second selection circuit, the integration circuit reads from the storage circuit corresponding to the second selection circuit said weigh value in accordance with a combination of the second evaluation value and said first evaluation value which makes a pair with the second evaluation value and is outputted from said first selection circuit, to integrate the read values and outputs the consequently obtained integrated value,
said addition circuit at least adds a plurality of integrated values outputted from said plurality of integration circuits in a case where said plurality of second selection circuits are on said first mode, so that a first addition value is obtained and becomes said first probability value, said addition circuit at least adds a plurality of integrated values outputted from said plurality of integration circuits in a case where said plurality of second selection circuits are on said second mode, so that a second addition value is obtained and becomes said second probability value, and said specification section specifies a predetermined entire image with said first and second specific images taken as a left-side part and a right-side part or an upper-side part and a lower-side part in said processing object image based on said first and second probability values obtained in said image processing circuit.

10. The image detection device according to claim 9, wherein said first and second specific images are images of a left-side part and a right-side part of a human face, and said predetermined entire image is an image of an entire human face.

* * * * *